United States Patent
Wang et al.

(10) Patent No.: US 12,369,198 B2
(45) Date of Patent: Jul. 22, 2025

(54) METHOD AND APPARATUS FOR RANDOM ACCESS PROCEDURE

(71) Applicant: Telefonaktiebolaget LM Ericsson (publ), Stockholm (SE)

(72) Inventors: Min Wang, Luleå (SE); Jinhua Liu, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 68 days.

(21) Appl. No.: 17/754,304

(22) PCT Filed: Sep. 23, 2020

(86) PCT No.: PCT/EP2020/076622
§ 371 (c)(1),
(2) Date: Mar. 29, 2022

(87) PCT Pub. No.: WO2021/063777
PCT Pub. Date: Apr. 8, 2021

(65) Prior Publication Data
US 2022/0377809 A1    Nov. 24, 2022

(30) Foreign Application Priority Data
Oct. 2, 2019   (WO) ................ PCT/CN2019/109794

(51) Int. Cl.
*H04W 74/0833*   (2024.01)
*H04W 72/1268*   (2023.01)
*H04W 74/08*     (2009.01)

(52) U.S. Cl.
CPC ... *H04W 74/0841* (2013.01); *H04W 72/1268* (2013.01); *H04W 74/0866* (2013.01)

(58) Field of Classification Search
CPC ......... H04W 74/0841; H04W 72/1268; H04W 74/0866; H04W 74/08; H04W 74/008;
(Continued)

(56) References Cited

U.S. PATENT DOCUMENTS

2017/0150523 A1   5/2017  Patel et al.
2018/0124790 A1   5/2018  Yerramalli
(Continued)

FOREIGN PATENT DOCUMENTS

| CN | 110140373 A    | 8/2019 |
| EP | 3481128 A1     | 5/2019 |
| WO | 2019/115861 A1 | 6/2019 |

OTHER PUBLICATIONS

International Search Report and Written Opinion for Application No. PCT/EP2020/076622, dated Nov. 26, 2020, 17 pages.
Huawei et al., "Random access in NR unlicensed," Apr. 16-20, 2018, 6 pages, 3GPP TSG RAN WG1 Meeting #92bis, R1-1803681, Sanya, China.
Nokia et al., "On uplink signal and channel structures for NR-U," Nov. 12-16, 2018, 18 pages, 3GPP TSG RAN WG1 Meeting #95, R1-1812660, Spokane, Washington.
ZTE et al., "On the remaining issues of msgA channel structure," Aug. 26-30, 2019, 23 pages, 3GPP TSG RAN WG1 #98, R1-1908181, Prague, Czech Republic.
(Continued)

*Primary Examiner* — Nguyen H Ngo
(74) *Attorney, Agent, or Firm* — Nicholson De Vos Webster & Elliott LLP

(57) ABSTRACT

Methods and apparatuses for random access procedure. A method at a terminal device comprises receiving information of a physical uplink shared channel (PUSCH) resource allocation mode from a network node. The PUSCH resource allocation mode includes at least one of interlace or non-interlace. The method further comprises transmitting a first message including a random access preamble and payload to the network node. The payload is transmitted on a PUSCH based on the PUSCH resource allocation mode.

17 Claims, 17 Drawing Sheets

(58) Field of Classification Search
CPC .. H04W 74/0833; H04W 72/23; H04L 5/008; H04L 5/0032; H04L 5/0041; H04L 5/0091; H04L 5/0048; H04L 5/0044; H04L 27/2601; H04L 5/0026; H04L 5/0064
USPC .... 370/229, 230, 230.1, 236, 252, 328, 329, 370/330, 341, 431, 464, 465, 468
See application file for complete search history.

(56) References Cited

U.S. PATENT DOCUMENTS

| | | | |
|---|---|---|---|
| 2019/0029019 A1* | 1/2019 | Zhang | H04L 5/0066 |
| 2019/0053271 A1 | 2/2019 | Islam et al. | |
| 2019/0068347 A1* | 2/2019 | Hamidi-Sepehr | H04W 72/12 |
| 2019/0124649 A1* | 4/2019 | Lunttila | H04W 72/0446 |
| 2019/0132882 A1 | 5/2019 | Li et al. | |
| 2020/0107277 A1* | 4/2020 | Jeon | H04W 52/36 |
| 2020/0322926 A1* | 10/2020 | Ly | H04W 74/0833 |
| 2021/0345416 A1* | 11/2021 | Hu | H04W 74/0833 |
| 2021/0400696 A1* | 12/2021 | Maki | H04W 16/14 |
| 2022/0014314 A1* | 1/2022 | Wang | H04L 5/0055 |
| 2022/0330349 A1* | 10/2022 | Mu | H04W 72/1268 |

OTHER PUBLICATIONS

Ericsson, "Feature lead summary for UL Signals and Channels," Aug. 26-30, 2019, 24 pages, 3GPP TSG-RAN WG1 Meeting #98, R1-1909474, Prague, Czech Republic.

3GPP TS 38.331 V15.5.1, "3rd Generation Partnership Project; Technical Specification Group Radio Access Network; NR; Radio Resource Control (RRC) protocol specification (Release 15)," Apr. 2019, 491 pages, 3GPP Organizational Partners.

Examination Report, IN App. No. 202247024680, Aug. 29, 2022, 7 pages.

International Preliminary Report on Patentability, PCT App. No. PCT/EP2020/076622, Dec. 22, 2021, 8 pages.

Written Opinion of the International Preliminary Examining Authority, PCT App. No. PCT/EP2020/076622, Sep. 15, 2021, 6 pages.

First Office Action, CN App. No. 202080069803.6, Jan. 20, 2025, 12 pages of Original Document only.

Vivo, "Discussion on channel structure for 2-step RACH", 3GPP TSG RAN WG1 #97, R1-1906124, May 13-17, 2019, 14 Pages.

Vivo, "Discussion on channel structure for 2-step RACH", 3GPP TSG RAN WG1 #98, Aug. 26-30, 2019, R1-1908134, 16 Pages.

ZTE, "Summary of Channel Structure for Two-step Rach", 3GPP TSG RAN WG1 #98, Aug. 26-30, 2019, R1-1909478, 90 pages.

* cited by examiner

METHOD AND APPARATUS FOR RANDOM ACCESS PROCEDURE

CROSS-REFERENCE TO RELATED APPLICATIONS

This application is a National stage of International Application No. PCT/EP2020/076622, filed Sep. 23, 2020, which claims priority to International Application No. PCT/CN2019/109794, filed Oct. 2, 2019, which are hereby incorporated by reference.

TECHNICAL FIELD

The non-limiting and exemplary embodiments of the present disclosure generally relate to the technical field of communications, and specifically to methods and apparatuses for random access procedure.

BACKGROUND

This section introduces aspects that may facilitate a better understanding of the disclosure. Accordingly, the statements of this section are to be read in this light and are not to be understood as admissions about what is in the prior art or what is not in the prior art.

In a wireless communication system such as NR (new radio), a random access procedure such as 4-step random access procedure is needed for a user equipment (UE) to get access to the communication system. Before initiating random access procedure, UE needs to go through an initial synchronization process. For example, the UE needs to detect a synchronization signal (SS) such as Primary Synchronization Signals (PSSs) and Secondary Synchronization Signals (SSSs), etc. Then the UE decodes broadcasted system information. The next step is known as the random access procedure.

In a 4-step random access procedure as shown in FIG. 1, a UE can transmit a PRACH (physical random access channel) preamble (msg1) in an uplink at step 102. The base station such as next generation NodeB (gNodeB or gNB) can reply with a RAR (Random Access Response, msg2) at step 104. The RAR may carry following information: temporary C-RNTI (cell radio network temporary identity); Timing Advance Value; and Uplink Grant Resource. The UE may then transmit a RRC (radio resource control) connection request message (msg3) on a physical uplink shared channel (PUSCH) at step 106. The RRC connection request message may contain following information: UE identity and connection establishment cause. The UE transmits PUSCH (msg3) after receiving a timing advance command in the RAR, allowing PUSCH to be received with a timing accuracy within the cyclic prefix. Without this timing advance, a very large CP (Cyclic-Prefix) would be needed in order to be able to demodulate and detect PUSCH, unless the system is applied in a cell with very small distance between the UE and the base station. The base station may respond with contention resolution message (msg4) to the UE at step 108.

For the 2-step random access procedure as shown in FIG. 2, the base station such gNB can configure (e.g., via system information signaling) PRACH preamble resources and contention based data resources that may be associated with one or multiple PRACH preambles. At step 202, the UE can transmit a message A (msgA) including the PRACH preamble and a data transmission in the associated data resources that can at least identify the UE by means of a UE identifier (ID). At step 204, the base station such as gNB sends a message B (msgB) including one or more of UE identifier assignment, timing advance information or contention resolution message, etc. if MsgA is correctly decoded by the base station such as gNB. Hence, in principle the 2-step random access procedure can pare down the round trip required for the base station such as gNB to transmit RAR and UE to transmit the Msg3 and consequently reduce the latency of the random access (RA) procedure.

An example of step 202 of FIG. 2 is illustrated in FIG. 3. Basically, the message which is transmitted in Msg3 for 4-step random access procedure may be transmitted immediately in the associated resources following the PRACH preamble for the 2-step random access procedure without waiting for the RAR from the base station such as gNB. For N PRACH preambles, there are N time-frequency resources with a preconfigured correspondence.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Some wireless communications systems such as NR may be required to comply with some regulations. For example, two requirements may be found in some regulations: Occupied channel bandwidth (OCB) and Maximum Power Spectral Density (PSD). The occupied bandwidth requirement may be expressed as the bandwidth containing 99% of the power of the signal and shall be between 80% and 100% of the declared Nominal Channel Bandwidth. Maximum PSD requirement may exist in many different regions. For example, the Maximum PSD requirement may be stated with a resolution bandwidth of 1 megahertz (MHz). For example, the Maximum PSD requirement may require 10 dBm/MHz for 5150-5350 MHz. The implication of the Maximum PSD requirement on physical layer design is that, without proper designs, a signal with a small transmission bandwidth may be limited in transmission power. This can negatively affect a coverage of the base station. That is, the maximum PSD requirement is a binding condition that requires changes to uplink transmissions in unlicensed spectrums and/or licensed spectrums.

In order to use the full output power, a block interleaved frequency division multiple access (BI-FDMA) approach can be used, also referred to as block interlaced transmission. For uplink transmission of small data block/PRACH/PUCCH (Physical Uplink Control Channel), interlaced physical resource blocks (PRBs) can be allocated to a UE so that there is the transmitted signal in each MHz.

FIG. 4 shows an example of interlace. For example, when the bandwidth is 20 MHz and subcarrier spacing (SCS) is 30 kilohertz (KHz), after taking into account guard bands, the total number of PRBs available for scheduling is 51, where each PRB consists of 12 subcarriers. Those PRBs can be divided into N=5 interlaces, each interlace consisting of M=10 (or 11) equally spaced PRBs. This design may offer a good tradeoff between satisfying regulatory requirements on occupied bandwidth and transmit power spectral density, overhead required for resource allocation signaling, and the degradation in single-carrier properties of the signal, i.e., increased peak-to-average power ratio.

A PUSCH resource unit may be a PUSCH occasion (PO) plus DMRS (Demodulation Reference Signal) port/DMRS sequence used for an Msg A payload transmission. For mapping between PRACH preambles in each RACH (random access channel) occasion (RO) and associated PUSCH resource units, it is expected to support at least one-to-one, multiple(N)-to-one and multiple(N)-to-one. For one-to-one mapping, a large amount of PUSCH resources needs to be reserved for the PUSCH in Msg A. On the other hand, multiple(N)-to-one mapping would cause high collision probability of PUSCH depending on the value of N.

For 2-step RA procedure, there are some issues. For example, the associated message transmission immediately following the PRACH transmission requires pre-allocated PUSCH resources. If one PUSCH resource is allocated for each PRACH preamble and there are 64 PRACH preambles configured for 2-step RA procedure, it requires to reserve 64 PUSCH resources. However, the number of interlaces of resources in a subband (for example, 20 MHz channel) are quite limited. That is, it cannot ensure that there is one reserved interlace for each PRACH preamble in the subband. The shortage of reserved interlaces needs to be solved.

In addition, to support interlace transmission for MsgA payload in 2-step RA procedure, the signaling for frequency domain resource allocation may need to include some necessary resource allocation (RA) fields, which are not existing and need to be defined.

As another issue, it may be not always necessary to enable interlaced transmissions for some UEs since non-interlaced transmission may be sufficient in some cases. Therefore, some signaling enhancements is also needed.

To overcome or mitigate at least one of the above mentioned problems or other problems or provide a useful solution, some embodiments of the present disclosure propose am improved random access procedure.

In a first aspect of the disclosure, there is provided a method at a terminal device. The method comprises receiving information of a physical uplink shared channel, PUSCH, resource allocation mode from a network node. The PUSCH resource allocation mode includes at least one of full interlace, partial interlace or non-interlace. The method further comprises transmitting a first message including a random access preamble and payload to the network node, wherein the payload is transmitted on a PUSCH based on the PUSCH resource allocation mode.

In an embodiment, the information of the PUSCH resource allocation mode may include at least one of an indicator of PUSCH resource allocation mode; an indicator of at least one allocated interlace; and at least one indicator of at least one scheduled physical resource block in the at least one allocated interlace, which are configured for the payload of the first message. The at least one allocated interlace may include at least one allocated full interlace and/or at least one allocated partial interlace.

In an embodiment, the PUSCH resource allocation mode may be configured for the payload of the first message.

In an embodiment, the information of the PUSCH resource allocation mode may be received by the terminal device in system information or dedicated signaling.

In an embodiment, the dedicated signaling may include at least one of dedicated radio resource control signaling, medium access control, MAC, control element, CE, or downlink control information, DCI.

In an embodiment, multiple physical resource blocks of an interlace may be unequally or equally split between two or more partial interlaces.

In an embodiment, for each random access channel occasion, RO, and associated one or more random access preambles, associated one or more PUSCH occasions may be configured with one or more (such as different) PUSCH resource allocation modes.

In an embodiment, a different PUSCH resource allocation mode may be configured for each random access channel occasion, RO, and associated one or more random access preambles.

In an embodiment, for each random access channel occasion, RO, and associated one or more random access preambles in a subband or channel, at least one associated PUSCH occasion may be located in a different subband or channel.

In an embodiment, the payload of the first message may include an identifier of the terminal device.

In an embodiment, a mapping between random access channel preamble and associated PUSCH may comprise one-to-one mapping, multiple-to-one mapping and one-to-multiple mapping.

In an embodiment, the first message is message A, msgA, and the second message is message B, msgB, in a two-step random access procedure.

In an embodiment, the method may further comprise selecting the PUSCH resource allocation mode based on at least one of a size of the payload, a downlink radio quality, channel occupancy, listen before talk, LBT, statistics, the terminal device's capability on whether the terminal device supports interlaced transmissions, or the terminal device's power class.

In an embodiment, selecting the PUSCH resource allocation mode based on the size of the payload; and/or selecting the PUSCH resource allocation mode based on the downlink radio quality; and/or when the channel occupancy is lower than a first threshold, selecting the partial interlace or the full interlace, when the channel occupancy is not lower than the first threshold, selecting the non-interlace; and/or when LBT failures statistics is lower than a second threshold, selecting the partial interlace or the full interlace, when the LBT failures statistics is not lower than the second threshold, selecting the non-interlace; and/or when the terminal device's capability indicates that the terminal device supports full or partial interlaced transmissions, selecting the full interlace or the partial interlace, when the terminal device's capability indicates that the terminal device does not support full and partial interlaced transmissions, selecting the non-interlace; and/or when the terminal device's power class is lower than a third threshold, selecting the partial interlace or the full interlace, when the terminal device's power class is not lower than the third threshold, selecting the non-interlace.

In an embodiment, a different PUSCH resource allocation mode may be used for a retransmission of the payload of the first message.

In an embodiment, the full interlace may span a full frequency region of an interlace and the partial interlace may span a part of frequency region of an interlace.

In an embodiment, the method may further comprise receiving a second message as a response to the first message from the network node.

In a second aspect of the disclosure, there is provided a method at a network node. The method comprises determining a physical uplink shared channel, PUSCH, resource allocation mode. The PUSCH resource allocation mode includes at least one of full interlace, partial interlace or non-interlace. The method further comprises transmitting information of the PUSCH resource allocation mode to a terminal device.

In an embodiment, the method may further comprise receiving a first message including a random access preamble and payload from the terminal device, wherein the payload is received on a PUSCH based on the PUSCH resource allocation mode. The method may further comprise transmitting a second message as a response to the first message to the terminal device.

In a third aspect of the disclosure, there is provided an apparatus at a terminal device. The apparatus comprises a processor; and a memory coupled to the processor, said memory containing instructions executable by said processor, whereby said apparatus is operative to receive information of a physical uplink shared channel, PUSCH, resource allocation mode from a network node. The PUSCH resource allocation mode includes at least one of full interlace, partial interlace or non-interlace. Said apparatus is further operative to transmit a first message including a random access preamble and payload to the network node, wherein the payload is transmitted on a PUSCH based on the PUSCH resource allocation mode.

In a fourth aspect of the disclosure, there is provided an apparatus at a network node. The network node comprises a processor; and a memory coupled to the processor, said memory containing instructions executable by said processor, whereby said apparatus is operative to determine a physical uplink shared channel, PUSCH, resource allocation mode. The PUSCH resource allocation mode includes at least one of full interlace, partial interlace or non-interlace. Said apparatus is further operative to transmit information of the PUSCH resource allocation mode to a terminal device.

In a fifth aspect of the disclosure, there is provided a terminal device. The terminal device comprises a receiving module and a transmitting module. The receiving module may be configured to receive information of a physical uplink shared channel, PUSCH, resource allocation mode from a network node. The PUSCH resource allocation mode may include at least one of full interlace, partial interlace or non-interlace. The transmitting module may be configured to transmit a first message including a random access preamble and payload on a PUSCH to the network node. The payload may be transmitted based on the PUSCH resource allocation mode.

In a sixth aspect of the disclosure, there is provided a network node. The network node comprises a determining module and a transmitting module. The determining module may be configured to determine a physical uplink shared channel, PUSCH, resource allocation mode. The PUSCH resource allocation mode may include at least one of full interlace, partial interlace or non-interlace. The transmitting module may be configured to transmit information of the PUSCH resource allocation mode to a terminal device.

In a seventh aspect of the disclosure, there is provided a method at a terminal device. The method comprises receiving information of a physical uplink shared channel, PUSCH, resource allocation mode from a network node. The PUSCH resource allocation mode indicates at least one of interlace or non-interlace. The method further comprises transmitting a first message including a random access preamble and payload to the network node, wherein the payload is transmitted on a PUSCH based on the PUSCH resource allocation mode.

In an embodiment, the interlace may comprise full interlace and/or partial interlace.

In an embodiment, the information of the PUSCH resource allocation mode may include at least one of an indicator of PUSCH resource allocation mode; an indicator of at least one allocated interlace; and at least one indicator of at least one scheduled physical resource block in the at least one allocated interlace, which are configured for the payload of the first message.

In an eighth aspect of the disclosure, there is provided a method at a network node. The method comprises determining a physical uplink shared channel, PUSCH, resource allocation mode. The PUSCH resource allocation mode indicates at least one of interlace or non-interlace. The method further comprises transmitting information of the PUSCH resource allocation mode to a terminal device.

In another of the disclosure, there is provided an apparatus at a terminal device. The apparatus comprises a processor; and a memory coupled to the processor, said memory containing instructions executable by said processor, whereby said apparatus is operative to receive information of a physical uplink shared channel, PUSCH, resource allocation mode from a network node. The PUSCH resource allocation mode indicates at least one of interlace or non-interlace. Said apparatus is further operative to transmit a first message including a random access preamble and payload to the network node, wherein the payload is transmitted on a PUSCH based on the PUSCH resource allocation mode.

In another aspect of the disclosure, there is provided an apparatus at a network node. The network node comprises a processor; and a memory coupled to the processor, said memory containing instructions executable by said processor, whereby said apparatus is operative to determine a physical uplink shared channel, PUSCH, resource allocation mode. The PUSCH resource allocation mode indicates at least one of interlace or non-interlace. Said apparatus is further operative to transmit information of the PUSCH resource allocation mode to a terminal device.

In another aspect of the disclosure, there is provided a terminal device. The terminal device comprises a receiving module and a transmitting module. The receiving module may be configured to receive information of a physical uplink shared channel, PUSCH, resource allocation mode from a network node. The PUSCH resource allocation mode may indicate at least one of interlace or non-interlace. The transmitting module may be configured to transmit a first message including a random access preamble and payload on a PUSCH to the network node. The payload may be transmitted based on the PUSCH resource allocation mode.

In another aspect of the disclosure, there is provided a network node. The network node comprises a determining module and a transmitting module. The determining module may be configured to determine a physical uplink shared channel, PUSCH, resource allocation mode. The PUSCH resource allocation mode may indicate at least one of interlace or non-interlace. The transmitting module may be configured to transmit information of the PUSCH resource allocation mode to a terminal device.

In another aspect of the disclosure, there is provided a computer program product, comprising instructions which, when executed on at least one processor, cause the at least one processor to carry out the method according to any of the above first, second, seventh and eighth aspects.

In another aspect of the disclosure, there is provided a computer-readable storage medium storing instructions which when executed by at least one processor, cause the at least one processor to carry out the method according to any of the above first, second, seventh and eighth aspects.

According to another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station may be configured to carry out any step of the methods according to the second and the eighth aspects.

According to another aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry may be configured to carry out any step of the methods according to the second and the eighth aspects.

According to another aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The terminal device may be configured to carry out any step of the methods according to the first and seventh aspects.

According to another aspect of the disclosure, there is provided a communication system including a host computer comprising processing circuitry configured to provide user data and a communication interface configured to forward user data to a cellular network for transmission to a terminal device. The terminal device comprises a radio interface and processing circuitry. The processing circuitry of the terminal device may be configured to carry out any step of the methods according to the first and seventh aspects.

According to another of the disclosure, there is provided a method implemented in a communication system including a host computer, a base station and a terminal device. The method comprises, at the host computer, receiving user data transmitted to the base station from the terminal device. The terminal device may be configured to carry out any step of the methods according to the first and seventh aspects.

According to another aspect of the disclosure, there is provided a communication system including a host computer comprising a communication interface configured to receive user data originating from a transmission from a terminal device to a base station. The terminal device comprises a radio interface and processing circuitry. The processing circuitry of the terminal device may be configured to carry out any step of the methods according to the first and seventh aspects.

According to another aspect of the disclosure, there is provided a method implemented in a communication system including a host computer, a base station and a terminal device. The method comprises, at the host computer, receiving, from the base station, user data originating from a transmission which the base station has received from the terminal device. The base station may be configured to carry out any step of the methods according to the second and the eighth aspects.

According to another aspect of the disclosure, there is provided a communication system including a host computer comprising a communication interface configured to receive user data originating from a transmission from a terminal device to a base station. The base station comprises a radio interface and processing circuitry. The base station's processing circuitry may be configured to carry out any step of the methods according to the second and the eighth aspects.

Embodiments herein afford many advantages, of which a non-exhaustive list of examples follows. Some embodiments herein may improve the RA capacity for 2-step RA in NR unlicensed and/or licensed network. Some embodiments of the present disclosure can address the PUSCH resource shortage for MsgA payload transmission in a 2-step RA in case an interlaced radio resource allocation for PUSCH is applied. Some embodiments of the present disclosure may be applicable to both licensed and unlicensed spectrum operations where the PUSCH transmission is based on an interlaced radio resource management. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
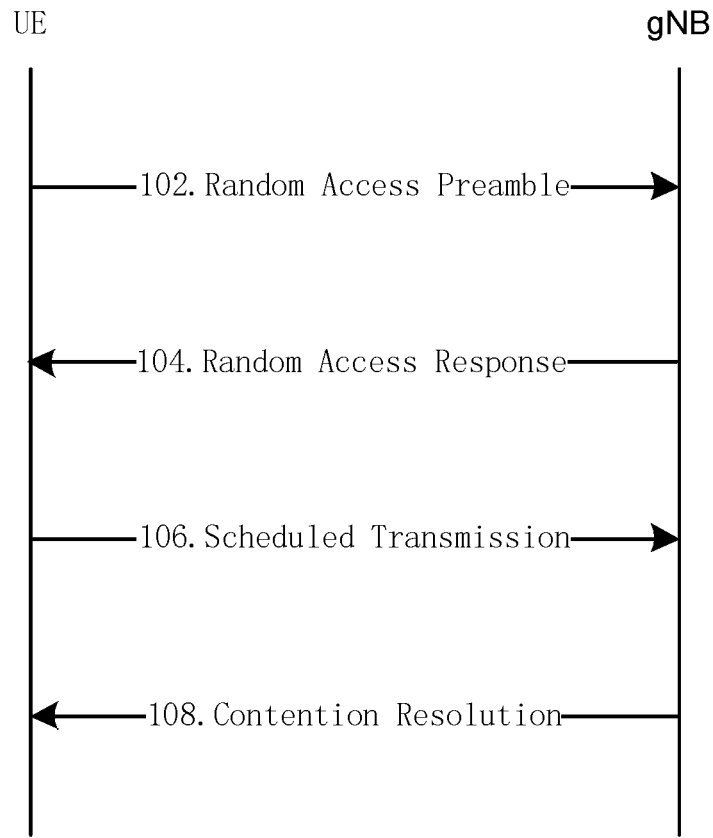
FIG. 1 shows a flowchart of a 4-step random access procedure.
Figure 2:
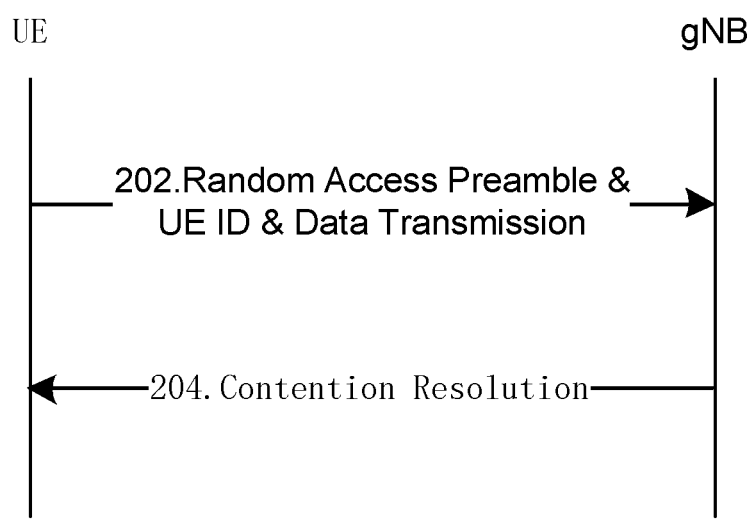
FIG. 2 shows a flowchart of a 2-step random access procedure.
Figure 3:
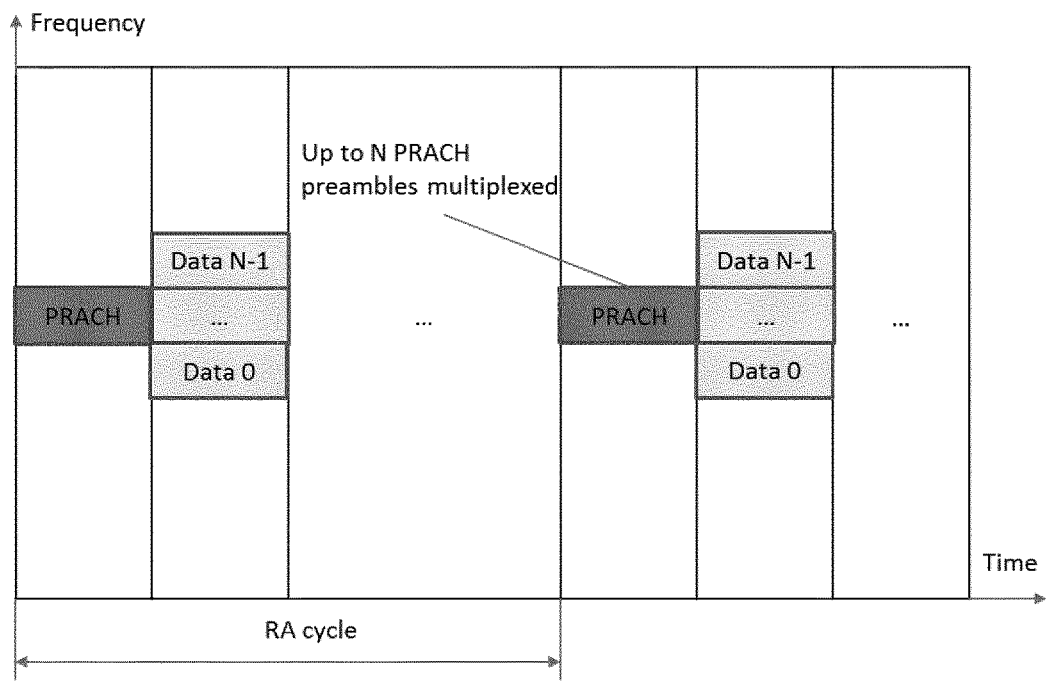
FIG. 3 shows an example of step 202 of FIG. 2.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3rd Generation Partnership Project (3GPP). For example, the communication protocols as may comprise the first generation (1G), 2G, 3G, 4G, 4.5G, 5G communication protocols, and/or any other protocols either currently known or to be developed in the future.

The term "network entity" or "network node" as used herein refers to a network device (physical or virtual) in a communication network. For example, the network node may be an access network device in a communication network via which a terminal device accesses to the network and receives services therefrom. For example, the network node may comprise, but not limited to, an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, in the wireless communication network, the terminal device may refer to a mobile terminal, a user equipment (UE), a terminal device, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, a downlink, DL, transmission refers to a transmission from a network device to a terminal device, and an uplink, UL, transmission refers to a transmission in an opposite direction.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that though the embodiments are mainly described in the context of 2-step random access procedure and NR, they are not limited to this but can be applied to any suitable random access procedure and network.

Figure 5A:
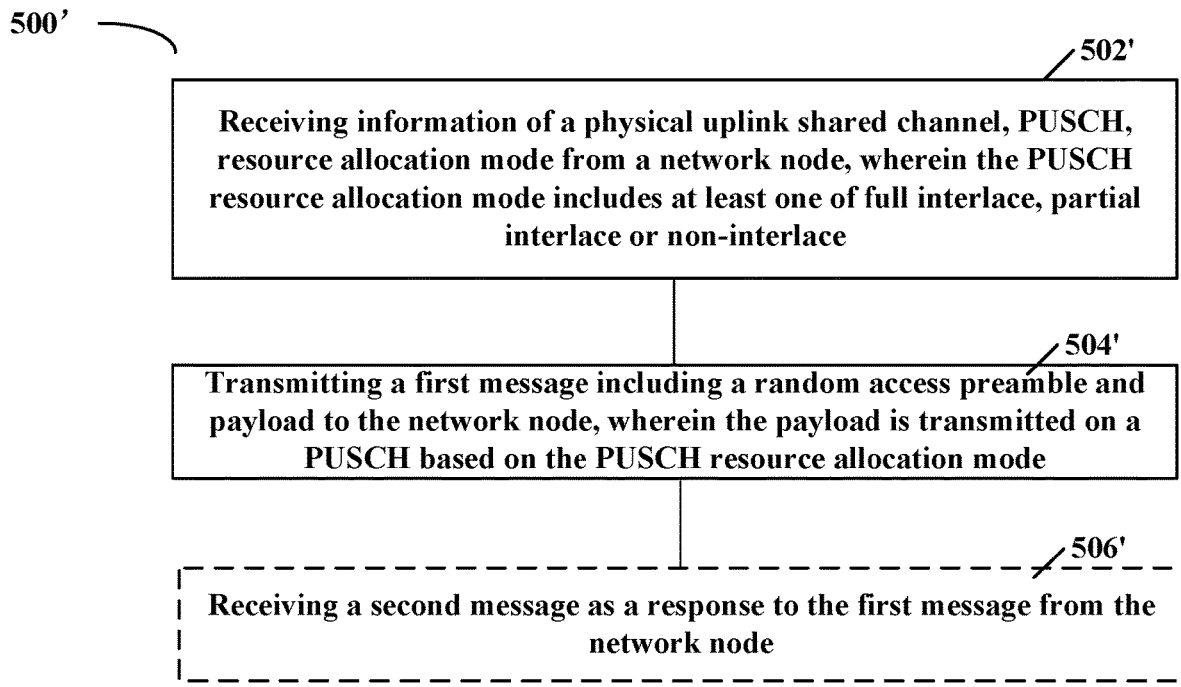
FIG. 5a shows a flowchart of a method according to an embodiment of the present disclosure.

FIG. 5a shows a flowchart of a method 500' according to an embodiment of the present disclosure, which may be performed by an apparatus implemented in or at or communicatively coupled to a terminal device or any other entity having similar functionality. As such, the terminal device may provide means or modules for accomplishing various parts of the method 500' as well as means or modules for accomplishing other processes in conjunction with other components.

At block 502', the terminal device may receive information of a physical uplink shared channel, PUSCH, resource allocation mode from a network node. The PUSCH resource allocation mode may include at least one of full interlace, partial interlace or non-interlace. As described above, before initiating random access procedure, the terminal device may need to go through an initial synchronization process. For example, the terminal device may detect a synchronization signal (SS) such as Primary Synchronization Signals (PSSs) and Secondary Synchronization Signals (SSSs). Then the UE may decode the broadcasted system information such as PBCH (Physical Broadcast Channel), RMSI (Remaining Minimum System Information), OSI (Other System Information), etc. In these broadcasted system information, the terminal device may receive the information of the PUSCH resource allocation mode from a network node. In other embodiments, the terminal device may receive the information of the PUSCH resource allocation mode from the network node in dedicated signaling for example when the terminal device has attached or registered to the network.

Figure 4:
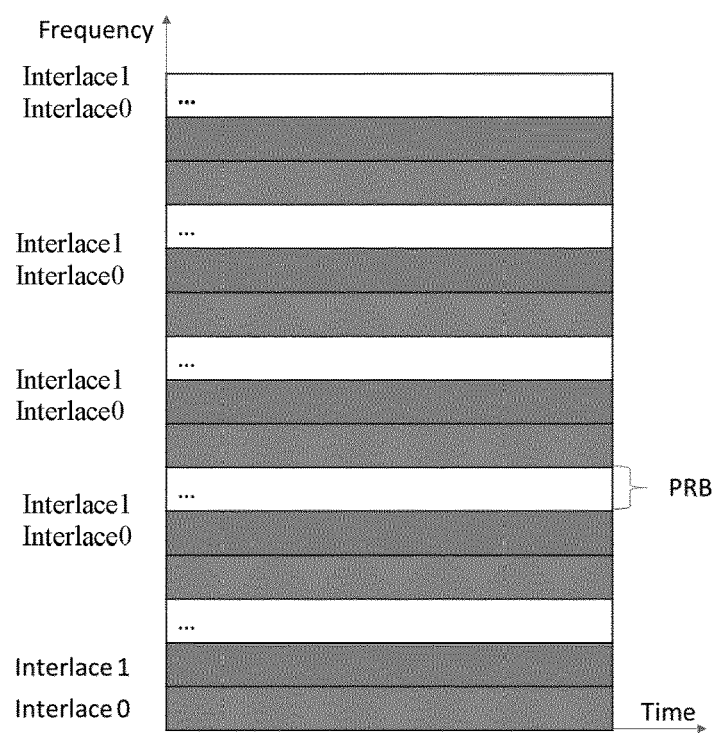
FIG. 4 shows an example of interlace according to an embodiment of the present disclosure.
Figure 6A:
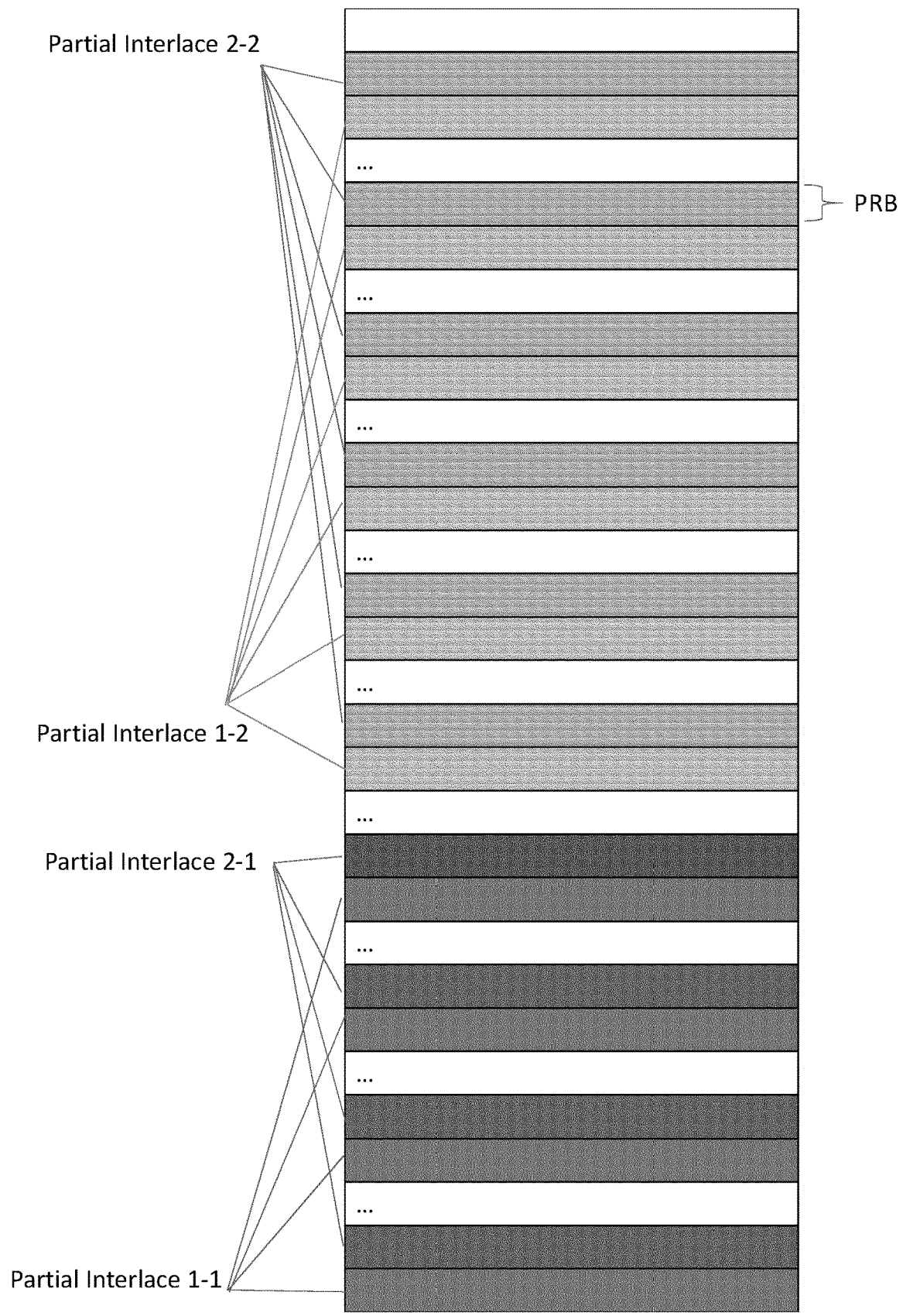
FIG. 6a shows an example that the PRBs of one interlace are unequally split between two partial interlaces.

In an embodiment, the full interlace may span a full frequency region of an interlace. For example, as shown in FIG. 4, interlace 1 and interlace 0 may be the full interlace. The partial interlace may span a part of frequency region of an interlace, for example partial interlaces 1-1, 1-2, 2-1 and 2-2 as shown in FIG. 6a. The numbers of frequency resources of different partial interlaces may be same or different.

At block 504', the terminal device may transmit transmitting a first message including a random access preamble and payload to the network node. The payload may be transmitted on a PUSCH based on the PUSCH resource allocation mode. For example, the terminal device may transmit the first message including a RACH preamble on a RACH occasion and payload on a PUSCH resource unit (PRU) to the network node.

In an embodiment, the payload may be transmitted based on the PUSCH resource allocation mode. For example, when the PUSCH resource allocation mode indicates full interlace, the terminal device may transmit the payload by using full interlace. When the PUSCH resource allocation mode indicates partial interlace, the terminal device may transmit the payload by using partial interlace. When the PUSCH resource allocation mode indicates non-interlace, the terminal device may transmit the payload by using non-interlace.

In an embodiment, the first message may be referred to as msgA herein, which may be similar to the corresponding msgA as described in documents of the 3GPP RAN1 (radio access network work group 1). In an embodiment, the first message may be a layer 1 message. The payload on the PUSCH may include any suitable information. For example, the payload on the PUSCH may include higher layer data such as RRC connection request possibly with some small payload on PUSCH. In an embodiment, the payload of the first message may include an identifier (ID) of the terminal device. In an embodiment, the channel structure of first message may include PRACH preamble and PUSCH carrying the payload. In an embodiment, the first message may also include the equivalent contents of msg3 of the 4-step random access procedure.

The random access preamble may be any suitable preamble used for random access procedure. For example, the random access preamble may be RACH preamble which may reuse the 3GPP Release 15 NR PRACH Preambles design. In an embodiment, there may be a mapping between the RACH preamble resource and PUSCH resource unit. In an embodiment, there may be any suitable supported modulation coding scheme(s) (MCS(s)) and time-frequency resource size(s) of PUSCH in msgA. In an embodiment, there may be any suitable power control of PUSCH of msgA. In an embodiment, UCI (uplink control information) may be included in the payload of msgA.

In an embodiment, the information of the PUSCH resource allocation mode may include at least one of an indicator of PUSCH resource allocation mode; an indicator of at least one allocated interlace; and at least one indicator of at least one scheduled physical resource block in the at least one allocated interlace, which are configured for the payload of the first message. At least one allocated interlace may include at least one allocated full interlace and/or at least one allocated partial interlace. The indicator may be any suitable indicator such as a bit, a bit of bitmap, etc.

In an embodiment, the information of the PUSCH resource allocation mode may be received by the terminal device in system information or dedicated signaling. For example, the information of the PUSCH resource allocation mode may be carried in system information, dedicated RRC signaling, medium access control control element (MAC CE), or downlink control information (DCI). The information of the PUSCH resource allocation mode may be added to the mapping tables or rules between ROs or preambles and POs or PRUs for the payload of the first message. In the resource management for MsgA payload, it can use the full interlace, the partial interlace and/or the non-interlace. For example, for the mapping between preambles in each RACH occasion (RO) and associated PUSCH resource units, the PRU or PO associated with every RO or preamble may span full resources of an interlace, or a part of resources of an interlace (i.e., a partial interlace) or use non-interlace transmission.

In an embodiment, multiple PRBs of an interlace may be unequally or equally split between two or more partial interlaces. The number of PRBs of each partial interlace may be same or different.

As a first example, the number of PRBs of an interlace may be equally split between different interlace parts (i.e. partial interlace). For example, assuming that a subband comprises 20 MHz bandwidth and SCS=15 KHz is configured for MsgA PUSCH transmission, there are 10 PRBs per interlace and these PRBs can be equally divided into two groups (i.e., partial interlace). In this way, each group comprises 5 PRBs. Each MsgA payload can use one group. As a result, two MsgA PUSCHs may share one interlace. In total there can be up to 20 MsgA PUSCH resource groups in one subband. With this option, the drawback is that the maximum transmit power for MsgA PUSCH transmission is reduced proportionally. However, this should not be an issue for the UE which is not at the cell edge. In is noted that the size of subband, the size of SCS, the number of PRBs in an interlace, the number of PRBs in a partial interlace are only for the purpose of illustration, and they can take any other suitable values in other embodiments or other communication system.

As a second example, the number of PRBs of an interlace may be unequally split between different interlace parts (i.e. partial interlace). For example, the number of PRBs of at least one partial interlace may be different from that of the other partial interlace(s). The selection of the partial interlace may consider the size of MsgA payload. For example, for a large size of MsgA payload, the terminal device may choose a partial interlace with more PRBs, while for a small size of MsgA payload, the terminal device may choose a partial interlace with fewer PRBs. The selection of the partial interlace may also consider downlink radio quality which may be measured. For example, in case of good radio quality (e.g. DL SSB (synchronization signal and physical broadcast channel block)/CSI-RS(Channel State Information Reference Signal) RSRP (Reference Signal Received Power) is greater than a preconfigured threshold), a partial interlace with fewer PRBs may be selected for MsgA PUSCH transmission. Otherwise a partial interlace with more PRBs may be selected for MsgA PUSCH transmission.

FIG. 6a shows one example that the PRBs of one interlace are unequally split between two partial interlaces. As shown in FIG. 6a, interlace 1, which comprises 10 PRBs, are split into partial interlace 1-1 comprising 4 PRBs and partial interlace 1-2 comprising 6 PRBs. In is noted that the numbers of PRBs in partial interlaces are only for the purpose of illustration, and they can take any other suitable values in other embodiments or other communication system.

In an embodiment, the PUSCH resource allocation mode may be configured for the payload of the first message. For example, the PUSCH resource allocation modes including non-interlace, full interlace, and partial interlace can be configured for MsgA payload. In an embodiment, the information of the PUSCH resource allocation mode may be received by the terminal device in system information or dedicated signaling. For example, the network device such as gNB may use at least one of system information or dedicated signaling to inform the information of the PUSCH resource allocation mode to the UEs in a cell.

As a first example, the system information may be any suitable system broadcast information. When the system information is used, an indicator on the PUSCH resource allocation mode for MsgA payload can be added to the system information. For example, the indicator on the PUSCH resource allocation mode for MsgA payload may be added into the information element (IE) RACH-Config-Common as described in 3GPP TS 38.331 V15.5.1, the disclosure of which is incorporated by reference herein in its entirety. The indicator for 2-step RA MsgA payload can be different from the one configured for 4-step RA Msg3.

As a second example, the dedicated signaling may be any suitable dedicated signaling such as at least one of dedicated radio resource control signaling, medium access control, MAC, control element, CE, or downlink control information, DCI, etc.

As a third example, for each random access channel occasion, RO, and associated one or more random access preambles, associated one or more PUSCH occasions may be configured with one or more (such as different) PUSCH resource allocation modes. For example, for each RACH occasion and associated RACH preambles, associated one or more PUSCH occasions may be configured with one or more (such as different) PUSCH resource allocation modes such as non-interlace, full interlace, or partial interlace, etc. When the terminal device has selected a RO and/or preamble, the UE may further select a PO associated with a suitable PUSCH resource allocation mode such as non-interlace, full interlace, or partial interlace, etc.

As a fourth example, a different PUSCH resource allocation mode may be configured for each random access channel occasion, RO, and associated one or more random access preambles. For example, for each RO and associated preambles, a different PUSCH resource allocation mode may be configured. In this example, ROs (in frequency domain or in time domain) and/or preambles may be split into different sets, and each set may be associated with a different PUSCH resource allocation mode for MsgA payload and/or Msg3 in 4-step RA.

With reference to FIG. 5a, at block 506' (optional), the terminal device may receive a second message as a response to the first message. The second message such as msgB may include any suitable information such as the equivalent contents of msg2 and msg4 of 4-step random access procedure. The second message may be a layer 1 message. In an embodiment, for the response to a successfully decoded msgA, the msgB may include TA (timing advance) command, contention resolution ID, etc.

In an embodiment, the first message may be message A, msgA, and the second message may be message B, msgB, in a two-step random access procedure.

Figure 5B:
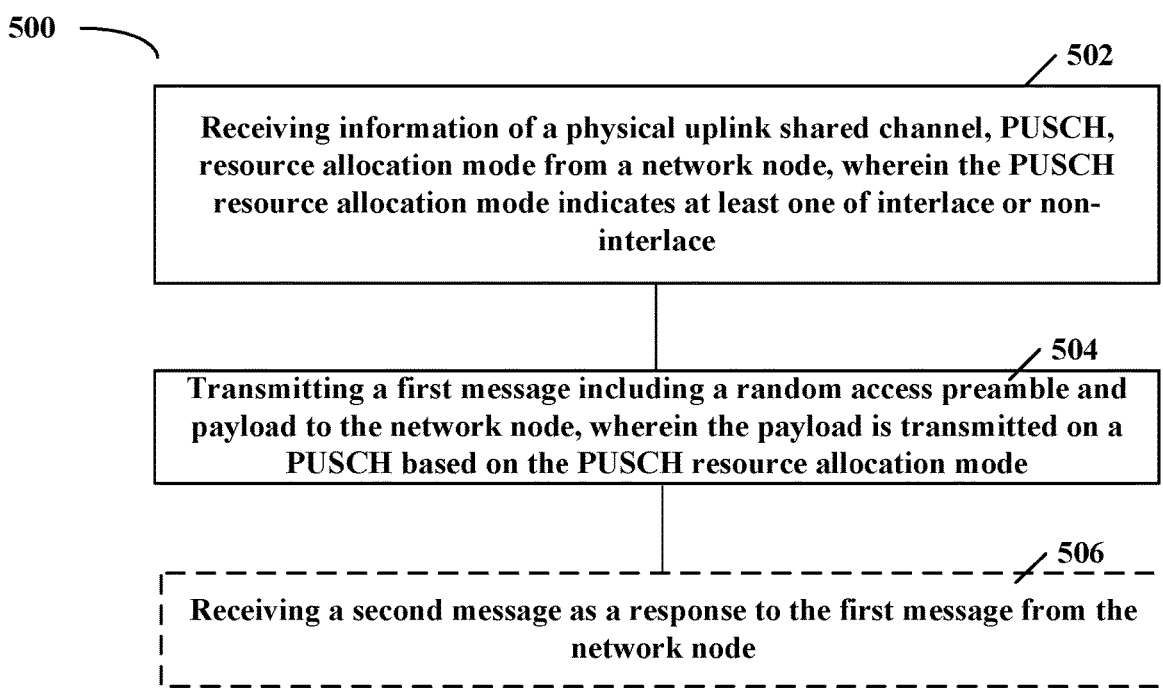
FIG. 5b shows a flowchart of a method according to another embodiment of the present disclosure.

FIG. 5b shows a flowchart of a method 500 according to another embodiment of the present disclosure, which may be performed by an apparatus implemented in or at or communicatively coupled to a terminal device or any other entity having similar functionality. For some parts which have been described in the above embodiments, detailed description thereof is omitted here for brevity.

At block 502, the terminal device may receive information of a physical uplink shared channel, PUSCH, resource allocation mode from a network node. The PUSCH resource allocation mode may indicate at least one of interlace or non-interlace.

In an embodiment, the interlace may comprise full interlace and/or partial interlace.

In an embodiment, In an embodiment, the information of the PUSCH resource allocation mode may include at least one of an indicator of PUSCH resource allocation mode; an indicator of at least one allocated interlace; and at least one indicator of at least one scheduled physical resource block in the at least one allocated interlace, which are configured for the payload of the first message.

Blocks 504 and 506 are same as blocks 504' and 506' of FIG. 5a.

Figure 6B:
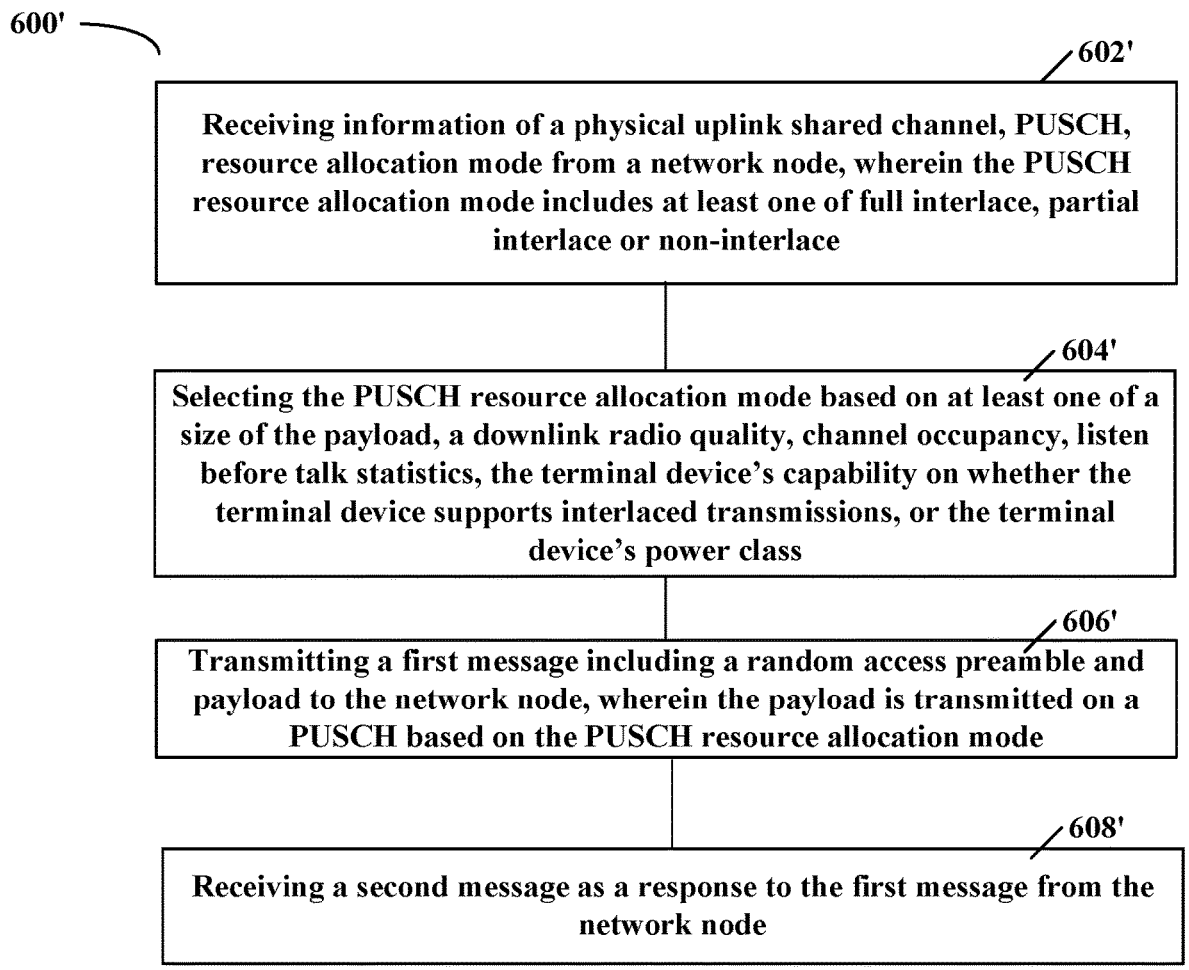
FIG. 6b shows a flowchart of a method according to another embodiment of the present disclosure.

FIG. 6b shows a flowchart of a method 600' according to another embodiment of the present disclosure, which may be performed by an apparatus implemented in or at or communicatively coupled to a terminal device or any other entity having similar functionality. As such, the terminal device may provide means or module for accomplishing various parts of the method 600' as well as means for accomplishing other processes in conjunction with other components. For some parts which have been described in the above embodiments, detailed description thereof is omitted here for brevity.

At block 602', the terminal device may receive information of a physical uplink shared channel, PUSCH, resource allocation mode from a network node. The PUSCH resource allocation mode may include at least one of full interlace, partial interlace or non-interlace. Block 602' is similar to block 502' of FIG. 5a.

At block 604', the terminal device may select the PUSCH resource allocation mode based on at least one of a size of the payload, a downlink radio quality, channel occupancy, listen before talk (LBT) statistics, the terminal device's capability on whether the terminal device supports interlaced transmissions, or the terminal device's power class.

In an embodiment, there may be a correspondence between the PUSCH resource allocation mode and the size range the payload; and/or there may be a correspondence between the PUSCH resource allocation mode and the downlink radio quality. In an embodiment, selecting the PUSCH resource allocation mode based on the size of the payload; and/or selecting the PUSCH resource allocation mode based on the downlink radio quality; and/or when the channel occupancy is lower than a first threshold, selecting the partial interlace or the full interlace, when the channel occupancy is not lower than the first threshold, selecting the non-interlace; and/or when LBT failures statistics is lower than a second threshold, selecting the partial interlace or the full interlace, when the LBT failures statistics is not lower than the second threshold, selecting the non-interlace; and/or when the terminal device's capability indicates that the terminal device supports full or partial interlaced transmissions, selecting the full interlace or the partial interlace, when the terminal device's capability indicates that the terminal device does not support full and partial interlaced transmissions, selecting the non-interlace; and/or when the terminal device's power class is lower than a third threshold, selecting the partial interlace or the full interlace, when the terminal device's power class is not lower than the third threshold, selecting the non-interlace.

Figure 7:
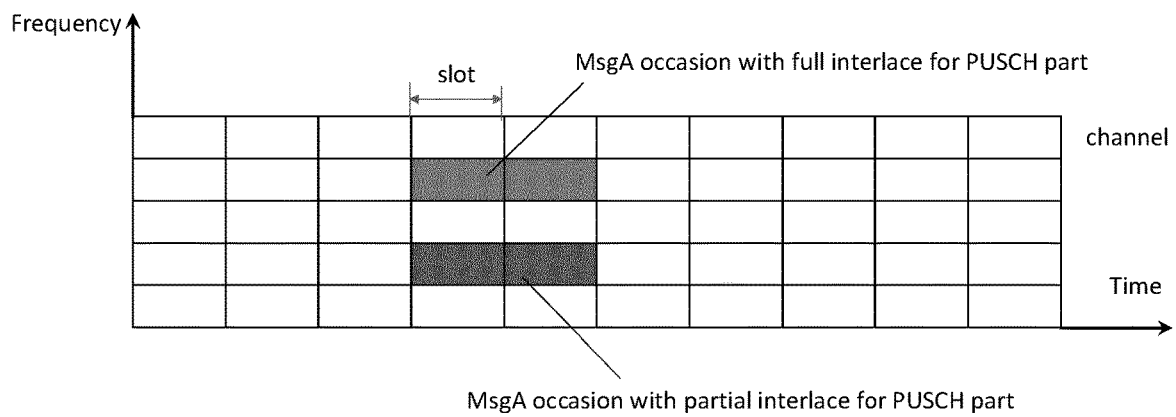
FIG. 7 shows multiple MsgA occasions in frequency domain according to an embodiment of the present disclosure.
Figure 8:
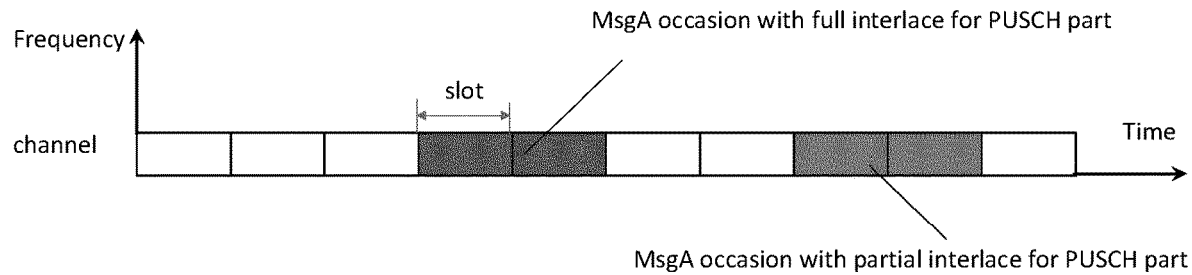
FIG. 8 shows multiple MsgA occasions in frequency domain according to another embodiment of the present disclosure.

For example, upon triggering of a 2-step RA event, the terminal device may choose a suitable PUSCH resource allocation mode for MsgA payload by considering at least one of below conditions:

1) measured downlink radio quality, or other DL or UL coverage measurement indicators;
2) MsgA payload size;
3) measured channel occupancy;
4) LBT statistics, e.g., LBT failures statistics;
5) terminal device capability on whether to support full or partial interlaced transmissions;
6) terminal device's power class;

In a first example, in case of good radio quality (e.g. DL SSB/CSI-RS RSRP is greater than a preconfigured threshold), the partial interlace or non-interlace mode may be selected for MsgA PUSCH transmission. Otherwise the full interlace based transmission mode may be selected for MsgA PUSCH transmission. Accordingly, two or more thresholds for determination of PUSCH resource allocation mode may be defined. For example, one threshold may be used to determine the non-interlaced mode, one threshold may be used to determine the partial interlaced mode, and one threshold may be used to determine the full interlaced mode. FIG. 7 shows multiple MsgA occasions in frequency domain according to an embodiment of the present disclosure. As shown in FIG. 7, one msgA occasion with partial interlace for PUSCH is in one channel while another msgA occasion with full interlace is in another channel. FIG. 8 shows multiple MsgA occasions in frequency domain according to another embodiment of the present disclosure. As shown in FIG. 8, one msgA occasion with partial interlace for PUSCH is in two slots while another msgA occasion with full interlace is in another two slots in the same channel.

In a second example, an interlaced transmission mode (i.e., full or partial) may be selected for MsgA payload if there is a small size of MsgA payload, while a non-interlaced transmission mode may be selected for MsgA payload if there are a big size of MsgA payload. Different transmission modes such as full interlaced transmission mode, partial interlaced transmission mode and non-interlaced transmission mode may be configured for different sizes of MsgA payload.

In the third example, in case the measured channel occupancy is low or LBT statistics indicate that there is seldom LBT failures occurred, the terminal device may consider to use interlaced transmissions (such as full interlaced transmission mode and partial interlaced transmission mode) for MsgA payload, otherwise, the terminal device may consider to use non-interlaced transmissions for MsgA payload.

In a fourth example, a terminal device capability on the PUSCH resource allocation mode may be used for determination of PUSCH resource allocation mode. The terminal device capability may indicate the terminal device on whether it supports interlaced based transmissions for MsgA payload. For example, when the terminal device supports interlaced based transmissions for MsgA payload, the terminal device may select the interlaced based transmissions such as full interlaced transmission mode and partial interlaced transmission mode. When the terminal device only supports non-interlaced based transmissions for MsgA payload, the terminal device may select the non-interlaced based transmissions.

In a fifth example, for a terminal device configured with low power class, it may be preferred to support interlaced transmissions for MsgA payload, while for a terminal device configured with higher power class, it may be sufficient to use non-interlaced transmissions for MsgA payload.

With reference to FIG. 6b, at block 606', the terminal device may transmit a first message including a random access preamble and payload on a PUSCH to the network node, wherein the payload is transmitted based on the PUSCH resource allocation mode. Block 606' is similar to block 504' of FIG. 5a.

At block 608', the terminal device may receive a second message as a response to the first message from the network node. Block 608' is similar to block 506' of FIG. 5a.

Figure 9:
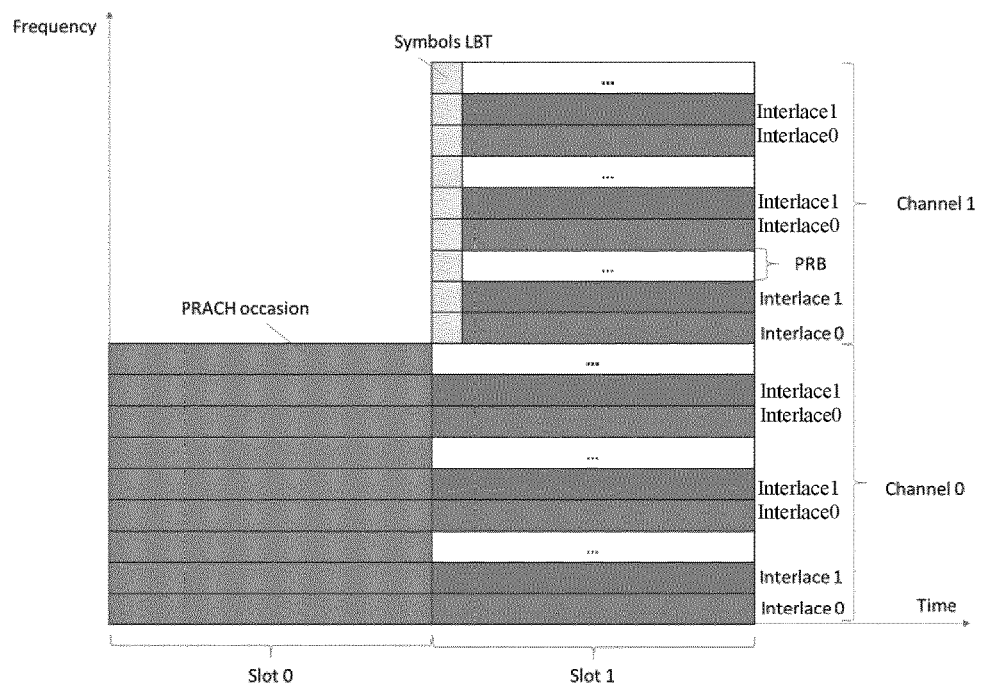
FIG. 9 shows an example of interlace resource pool across channels according to an embodiment of the present disclosure.

In an embodiment, for each random access channel occasion, RO, and associated one or more random access preambles in a subband or channel, at least one associated PUSCH occasion may be located in a different subband or channel. FIG. 9 shows an example of interlace resource pool across channels according to an embodiment of the present disclosure. For example, for each RO and associated one or more preambles in a subband/channel, some associated one or more POs for MsgA PUSCH may be located in a different subband/channel so that a large MsgA PUSCH resource pool can be achieved. For those interlaces which are not collocated in the same subband/channel as PRACH preamble transmission, the terminal device can perform LBT to determine which PO and the associated interlace is available for MsgA PUSCH transmission. For the same RA procedure, the UE may use different PUSCH interlaces for performing MsgA payload retransmissions.

In an embodiment, a mapping between random access channel preamble and associated PUSCH comprises one-to-one mapping, multiple-to-one mapping and one-to-multiple mapping. The one-to-one mapping, multiple-to-one mapping and one-to-multiple mapping may be similar to those as described in documents of the 3GPP RAN1.

In an embodiment, a different PUSCH resource allocation mode may be used for a retransmission of the payload of the first message. For example, for the same RA procedure, the terminal device may change PUSCH resource allocation mode between different MsgA retransmission attempts. For example, the UE may use non-interlaced transmission for MsgA payload initial transmission. When the terminal device does not get the second message such as RAR message from the network node such as gNB after a configured time period (e.g., the RAR window has expired), the terminal device may choose to use interlaced transmissions for MsgA payload retransmissions.

Figure 6C:
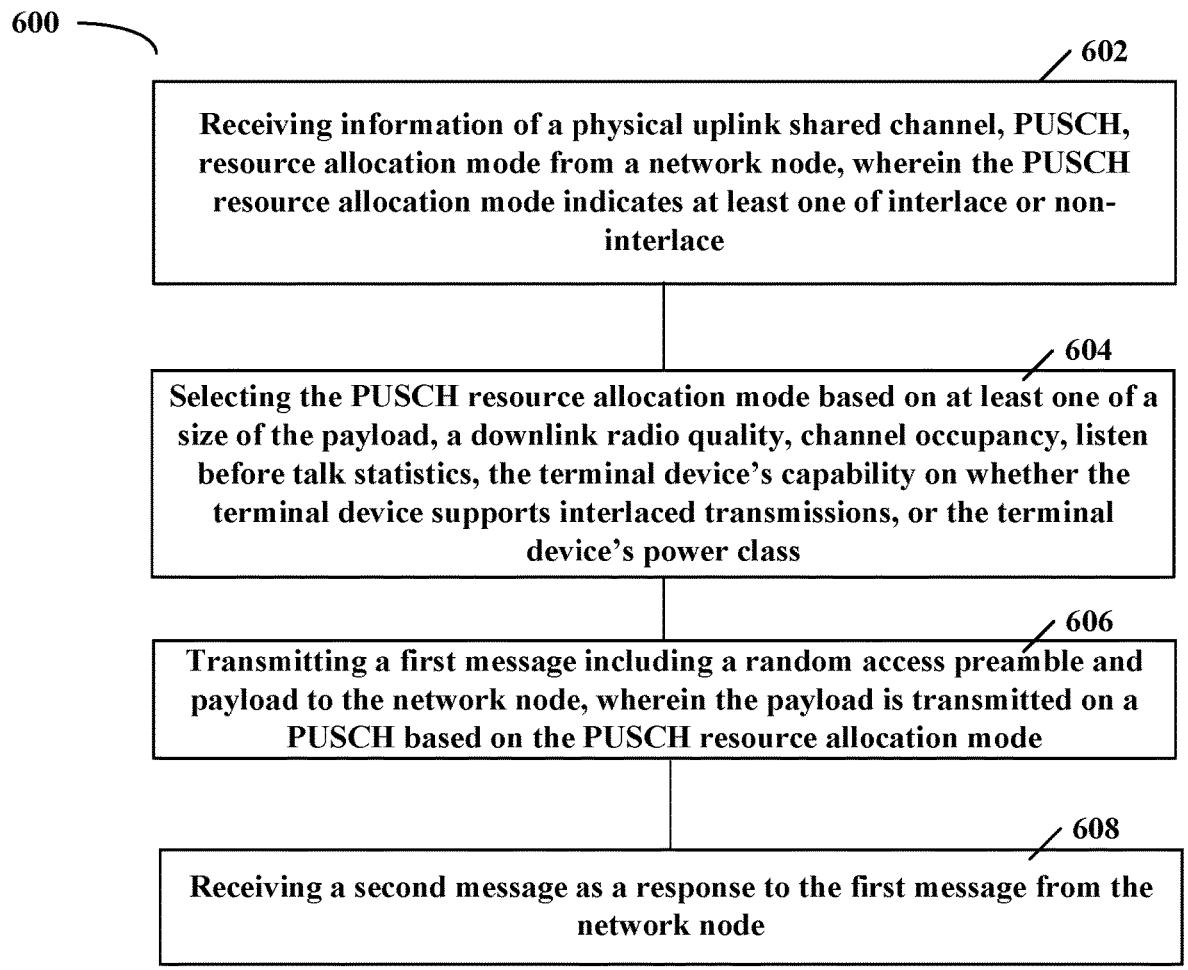
FIG. 6c shows a flowchart of a method according to another embodiment of the present disclosure.

FIG. 6c shows a flowchart of a method 600 according to another embodiment of the present disclosure, which may be performed by an apparatus implemented in or at or communicatively coupled to a terminal device or any other entity having similar functionality. For some parts which have been described in the above embodiments, detailed description thereof is omitted here for brevity.

At block 602, the terminal device may receive information of a physical uplink shared channel, PUSCH, resource allocation mode from a network node. The PUSCH resource allocation mode may indicate at least one of interlace or non-interlace.

Blocks 604, 606 and 608 are same as blocks 604', 606' and 608' of FIG. 6b.

Figure 10A:
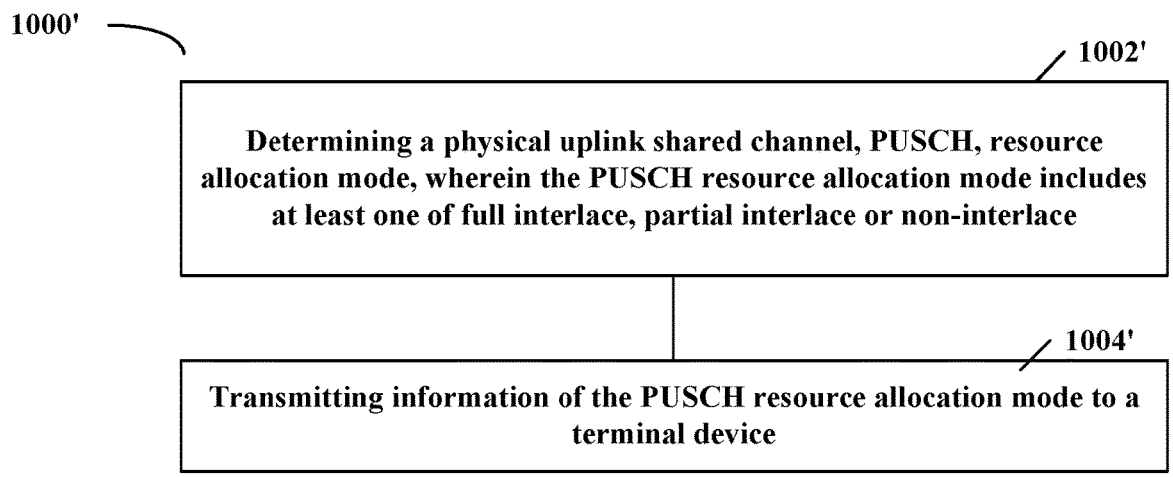
FIG. 10a shows a flowchart of a method according to another embodiment of the present disclosure.

FIG. 10a shows a flowchart of a method 1000' according to an embodiment of the present disclosure, which may be performed by an apparatus implemented in or at or communicatively coupled to a network device or any other entity having similar functionality. As such, the network device may provide means or modules for accomplishing various parts of the method 1000' as well as means for accomplishing other processes in conjunction with other components. For some parts which have been described in the above embodiments, detailed description thereof is omitted here for brevity.

At block 1002', the network device may determine a PUSCH resource allocation mode. The PUSCH resource allocation mode may include at least one of full interlace, partial interlace or non-interlace. For each PUSCH, the network device may determine at least one of full interlace, partial interlace or non-interlace. For example, the network device may determine that one PUSCH may support the full interlace, the partial interlace or non-interlace. The network device may determine that another PUSCH may support the full interlace or the partial interlace, and so on. The network device may determine the PUSCH resource allocation mode based on various factors, such as the number of terminal devices in the cell, the expected number of terminal devices to be attached or registered to the network via the network node, the number of available resources of the PUSCH, etc.

At block 1004', the network device may transmit information of the PUSCH resource allocation mode to a terminal device.

In an embodiment, the information of the PUSCH resource allocation mode may include at least one of an indicator of PUSCH resource allocation mode, an indicator of at least one allocated interlace and/or at least one allocated partial interlace, and at least one indicator of at least one scheduled physical resource block in the at least one allocated interlace and/or at least one allocated partial interlace which are configured for the payload of the first message.

In an embodiment, the PUSCH resource allocation mode may be configured for the payload of the first message.

In an embodiment, the information of the PUSCH resource allocation mode may be transmitted to the terminal device in system information or dedicated signaling.

In an embodiment, the dedicated signaling may include at least one of dedicated radio resource control signaling, medium access control, MAC, control element, CE, or downlink control information, DCI.

In an embodiment, multiple physical resource blocks of an interlace may be unequally or equally split between two or more partial interlaces.

In an embodiment, for each random access channel occasion, RO, and associated one or more random access preambles, associated one or more PUSCH occasions may be configured with one or more PUSCH resource allocation modes.

In an embodiment, a different PUSCH resource allocation mode may be configured for each random access channel occasion, RO, and associated one or more random access preambles.

In an embodiment, for each random access channel occasion, RO, and associated one or more random access preambles in a subband or channel, at least one associated PUSCH occasion may be located in a different subband or channel.

Figure 10B:
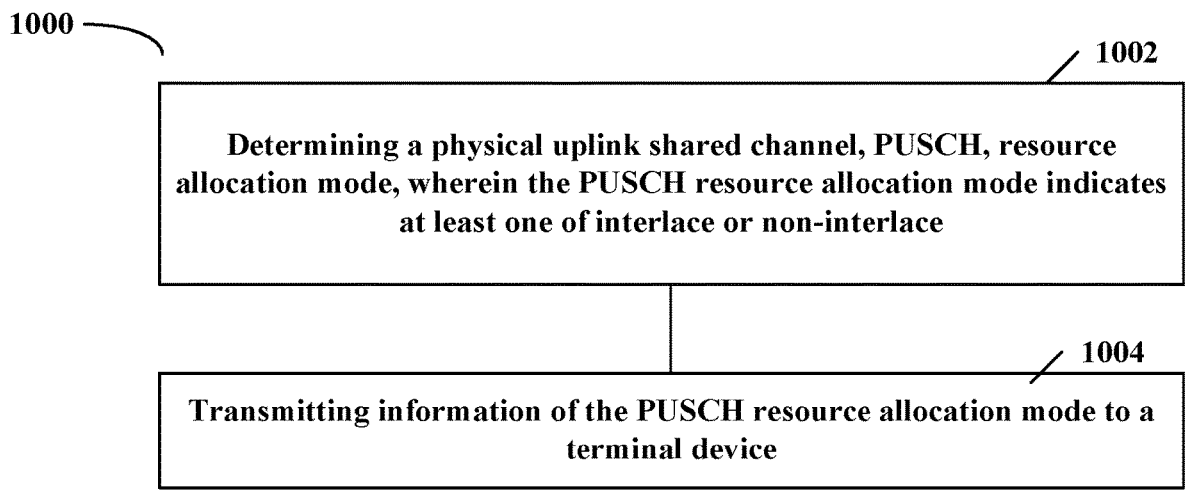
FIG. 10b shows a flowchart of a method according to another embodiment of the present disclosure.

FIG. 10b shows a flowchart of a method 1000 according to another embodiment of the present disclosure, which may be performed by an apparatus implemented in or at or communicatively coupled to a network device or any other entity having similar functionality. For some parts which have been described in the above embodiments, detailed description thereof is omitted here for brevity.

At block 1002, the network device may determine a PUSCH resource allocation mode. The PUSCH resource allocation mode may indicate at least one of interlace or non-interlace.

Block 1004 is same as blocks 1004' of FIG. 10a.

Figure 11:
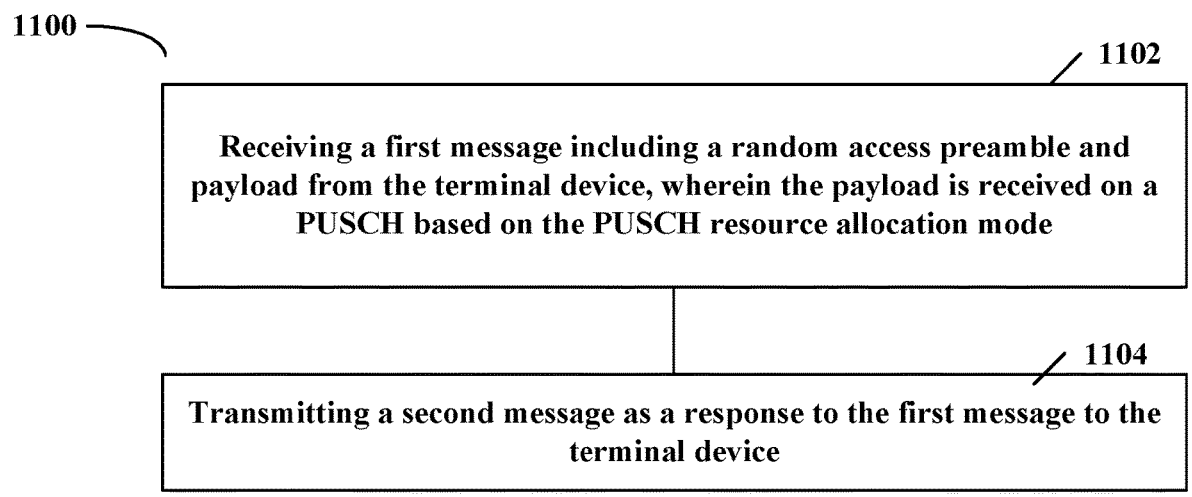
FIG. 11 shows a flowchart of a method according to another embodiment of the present disclosure.

FIG. 11 shows a flowchart of a method 1100 according to an embodiment of the present disclosure, which may be performed by an apparatus implemented in or at or communicatively coupled to a network device or any other entity having similar functionality. As such, the network device may provide means or modules for accomplishing various parts of the method 1100 as well as means for accomplishing other processes in conjunction with other components. For some parts which have been described in the above embodiments, detailed description thereof is omitted here for brevity.

At block 1102, the network device may receive a first message including a random access preamble and payload on a PUSCH from the terminal device. The payload may be received based on the PUSCH resource allocation mode. For example, the terminal device may transmit the first message at block 504' of FIG. 5a or at block 504 of FIG. 5b, and then the network device may receive the first message from the network node.

At block 1104, the network device may transmit a second message as a response to the first message to the terminal device. The second message such as msgB may include any suitable information such as the equivalent contents of msg2 and msg4 of 4-step random access procedure. The second message may be a layer 1 message. In an embodiment, for the response to a successfully decoded msgA, the msgB may include TA (timing advance) command, contention resolution ID, etc.

In an embodiment, the payload of the first message may include an identifier of the terminal device.

In an embodiment, a mapping between random access channel preamble and associated PUSCH may comprise one-to-one mapping, multiple-to-one mapping and one-to-multiple mapping.

In an embodiment, the first message may be msgA and the second message may be msgB in a two-step random access procedure.

In an embodiment, the PUSCH resource allocation mode may be selected by the terminal device based on at least one of a size of the payload, a downlink radio quality, channel occupancy, listen before talk statistics, the terminal device's capability on whether the terminal device supports interlaced transmissions, or the terminal device's power class.

In an embodiment, there may be a correspondence between the PUSCH resource allocation mode and the size range the payload; and/or there may be a correspondence between the PUSCH resource allocation mode and the downlink radio quality. In an embodiment, the PUSCH resource allocation mode is selected based on the size of the payload; and/or selecting the PUSCH resource allocation mode is selected based on the downlink radio quality; and/or when the channel occupancy is lower than a first threshold, and/or when the channel occupancy is lower than a first threshold, the partial interlace or the full interlace may be selected, when the channel occupancy is not lower than the first threshold, the non-interlace may be selected; and/or when LBT failures statistics is lower than a second threshold, the partial interlace or the full interlace may be selected, when the LBT failures statistics is not lower than the second threshold, the non-interlace may be selected; and/or when the terminal device's capability indicates that the terminal device supports full or partial interlaced transmissions, the full interlace or the partial interlace may be selected, when the terminal device's capability indicates that the terminal device does not support full and partial interlaced transmissions, the non-interlace may be selected; and/or when the terminal device's power class is lower than a third threshold, the partial interlace or the full interlace may be selected, when the terminal device's power class is not lower than the third threshold, the non-interlace may be selected.

In an embodiment, a different PUSCH resource allocation mode may be used for a retransmission of the payload of the first message.

In an embodiment, the full interlace may span a full frequency region of an interlace and the partial interlace may span a part of frequency region of an interlace.

Embodiments herein afford many advantages, of which a non-exhaustive list of examples follows. Some embodiments herein may improve the RA capacity for 2-step RA in NR unlicensed and/or licensed network. Some embodiments of the present disclosure can address the PUSCH resource shortage for MsgA payload transmission in a 2-step RA in case an interlaced radio resource allocation for PUSCH is applied. Some embodiments of the present disclosure may be applicable to both licensed and unlicensed spectrum operations where the PUSCH transmission is based on an interlaced radio resource management. The embodiments herein are not limited to the features and advantages mentioned above. A person skilled in the art will recognize additional features and advantages upon reading the following detailed description.

Figure 12:
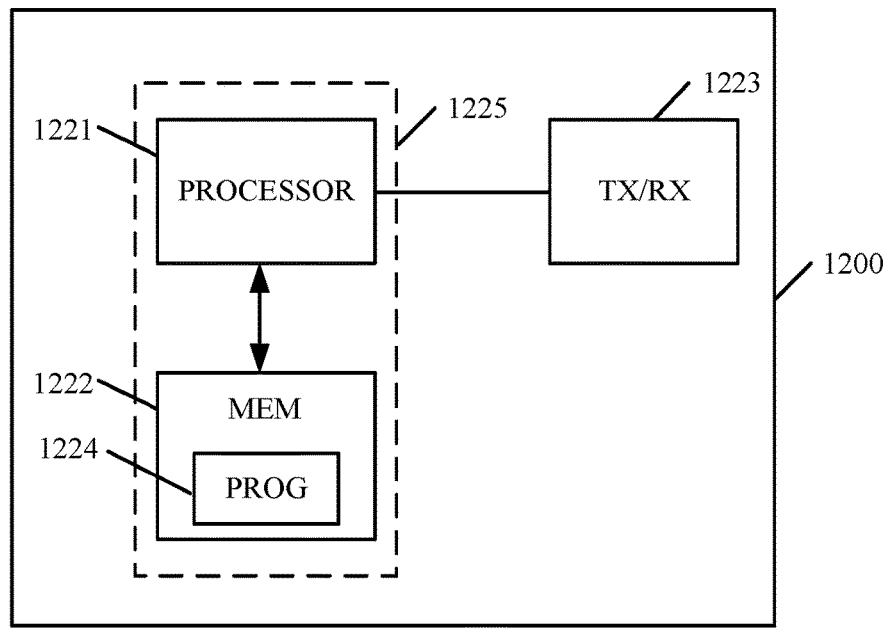
FIG. 12 is a block diagram showing an apparatus suitable for use in practicing some embodiments of the disclosure.

FIG. 12 is a block diagram showing an apparatus suitable for use in practicing some embodiments of the disclosure. For example, any one of the terminal device and the network node described above may be implemented through the apparatus 1200.

The apparatus 1200 comprises at least one processor 1221, such as a DP (digital processor), and at least one MEM (memory) 1222 coupled to the processor 1221. The apparatus 1220 may further comprise a transmitter (TX) and receiver (RX) 1223 coupled to the processor 1221. The MEM 1222 stores a PROG (program) 1224. The PROG 1224 may include instructions that, when executed on the associated processor 1221, enable the apparatus 1220 to operate in accordance with the embodiments of the present disclosure. A combination of the at least one processor 1221 and the at least one MEM 1222 may form processing means 1225 adapted to implement various embodiments of the present disclosure.

Various embodiments of the present disclosure may be implemented by computer program executable by one or more of the processor 1221, software, firmware, hardware or in a combination thereof.

The MEM 1222 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1221 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the terminal device, the memory 1222 contains instructions executable by the processor 1221, whereby the terminal device operates according to any of the methods related to the terminal device as described above.

In an embodiment where the apparatus is implemented as or at the network node, the memory 1222 contains instructions executable by the processor 1221, whereby the network node operates according to any of the methods related to the network node as described above.

Figure 13:
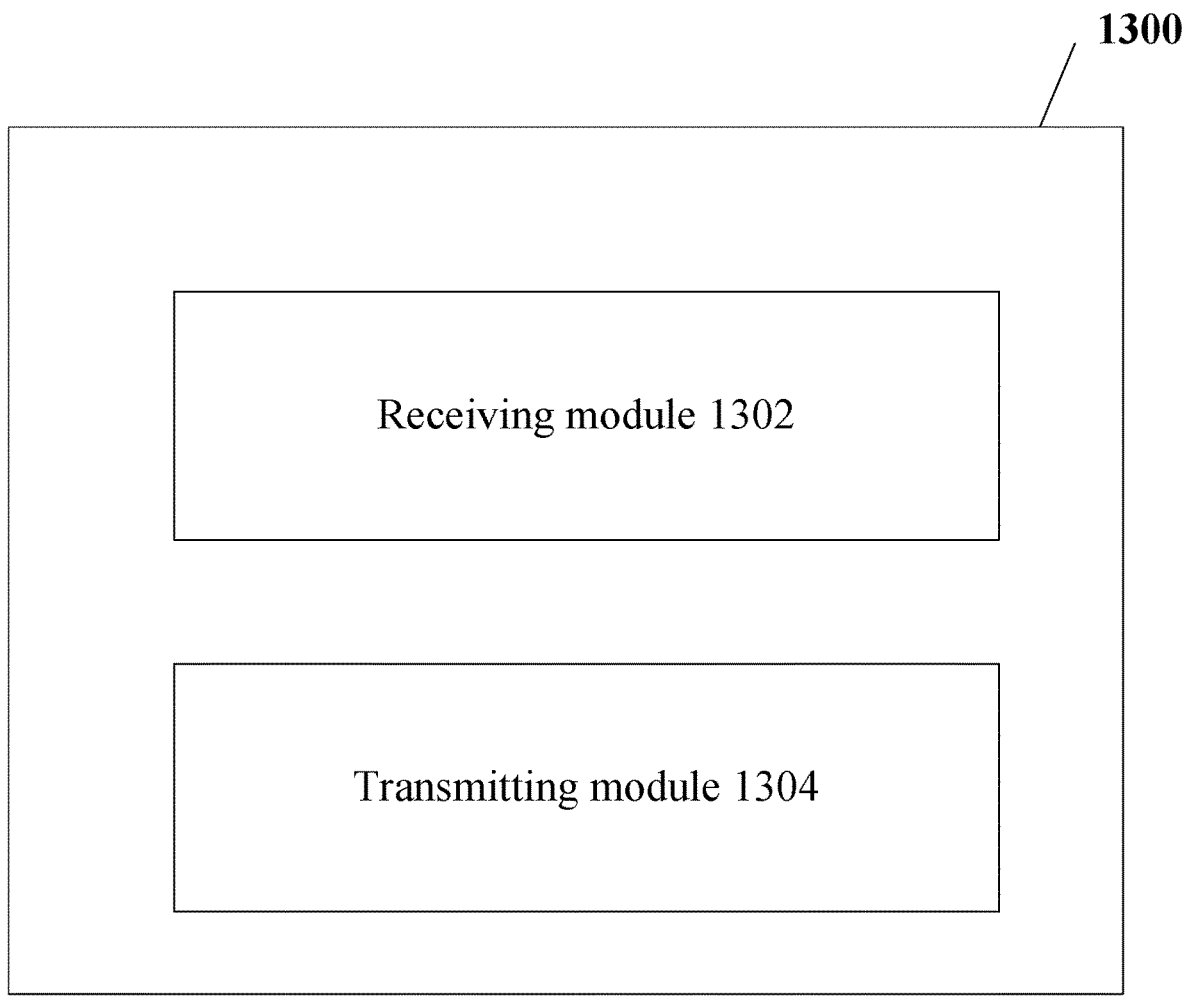
FIG. 13 is a block diagram showing a terminal device according to an embodiment of the disclosure.

FIG. 13 is a block diagram showing a terminal device according to an embodiment of the disclosure. As shown, the terminal device 1300 comprises a receiving module 1302 and a transmitting module 1304. The receiving module 1302 may be configured to receive information of a physical uplink shared channel, PUSCH, resource allocation mode from a network node. In an embodiment, the PUSCH resource allocation mode may include at least one of full interlace, partial interlace or non-interlace. In another embodiment, the PUSCH resource allocation mode may indicate at least one of interlace or non-interlace. The transmitting module 1304 may be configured to transmit a first message including a random access preamble and payload on a PUSCH to the network node. The payload may be transmitted based on the PUSCH resource allocation mode.

Figure 14:
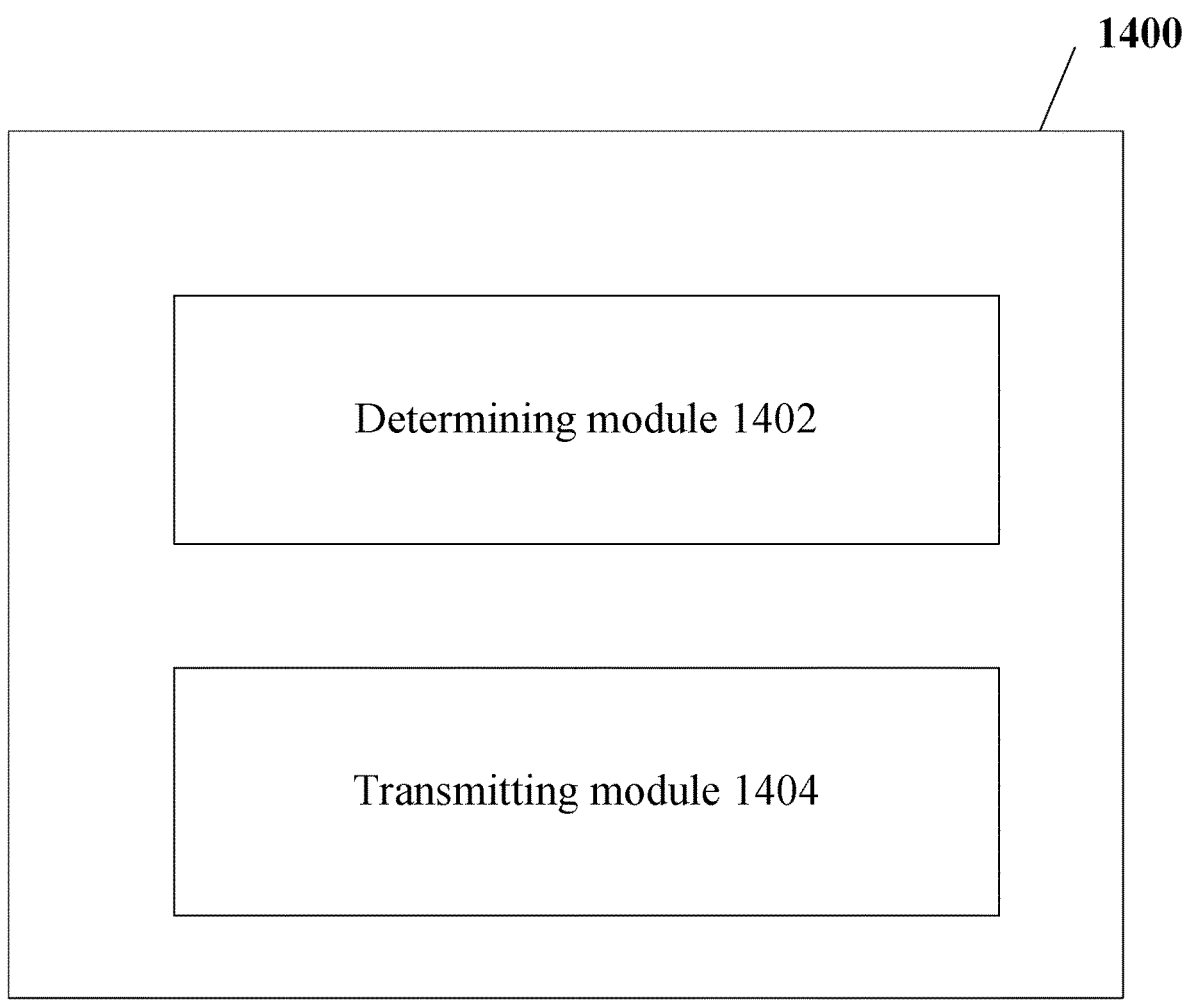
FIG. 14 is a block diagram showing a network node according to an embodiment of the disclosure.

FIG. 14 is a block diagram showing a network node according to an embodiment of the disclosure. As shown, the network node 1400 comprises a determining module 1402 and a transmitting module 1404. The determining module 1402 may be configured to determine a physical uplink shared channel, PUSCH, resource allocation mode. In an embodiment, the PUSCH resource allocation mode may include at least one of full interlace, partial interlace or non-interlace. In another embodiment, the PUSCH resource allocation mode may indicate at least one of interlace or non-interlace. The transmitting module 1404 may be configured to transmit information of the PUSCH resource allocation mode to a terminal device.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, any of the network node and the terminal device may not need a fixed processor or memory, any computing resource and storage resource may be arranged from any of the network node and the terminal device. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods related to the network node and the terminal device as described above.

According to an aspect of the disclosure it is provided a computer-readable storage medium storing instructions which when executed by at least one processor, cause the at least one processor to carry out any of the methods related to the network node and the terminal device as described above.

Figure 15:
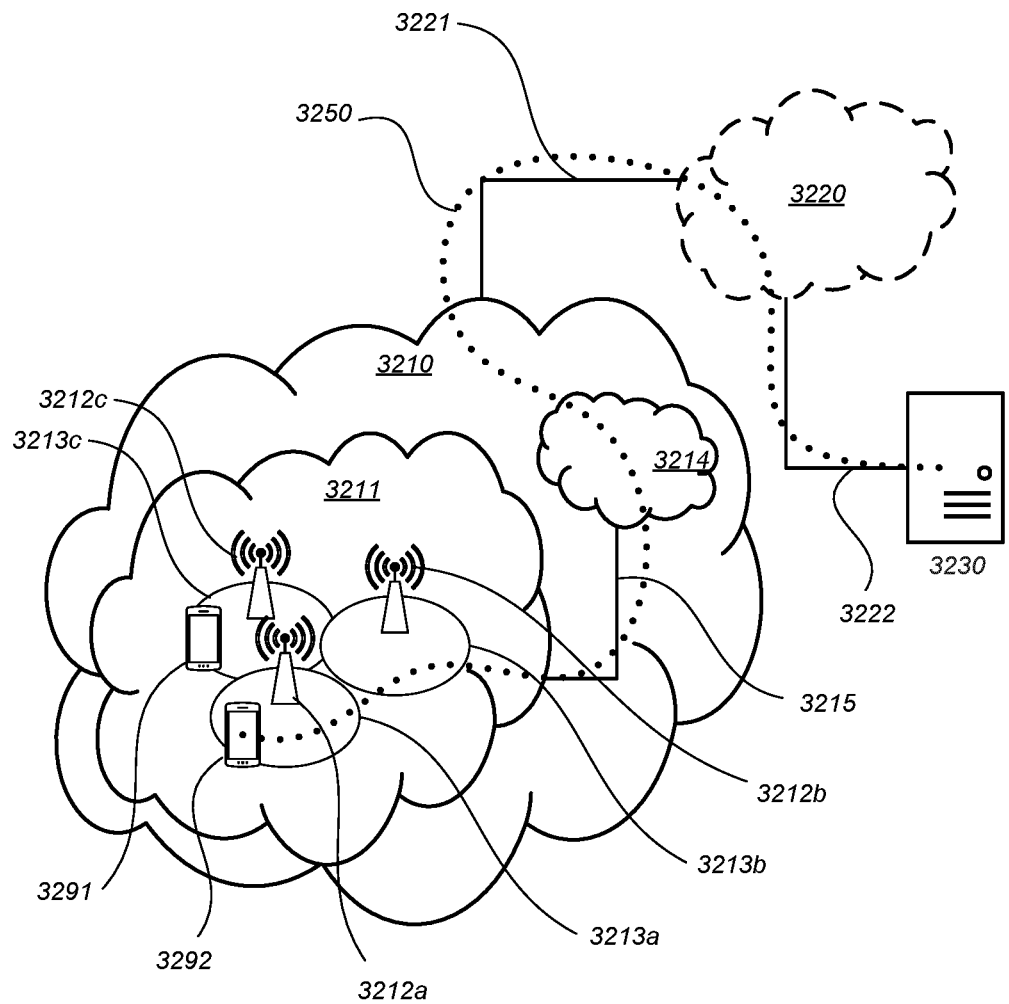
FIG. 15 is a diagram showing a telecommunication network connected via an intermediate network to a host computer in accordance with some embodiments.

With reference to FIG. 15, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network;

intermediate network 3220, if any, may be a backbone network or the Internet; in particular, intermediate network 3220 may comprise two or more sub-networks (not shown).

The communication system of FIG. 15 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 16. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 16) served by base station 3320. Communication interface 3326 may be configured to facilitate connection 3360 to host computer 3310. Connection 3360 may be direct or it may pass through a core network (not shown in FIG. 16) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 16:
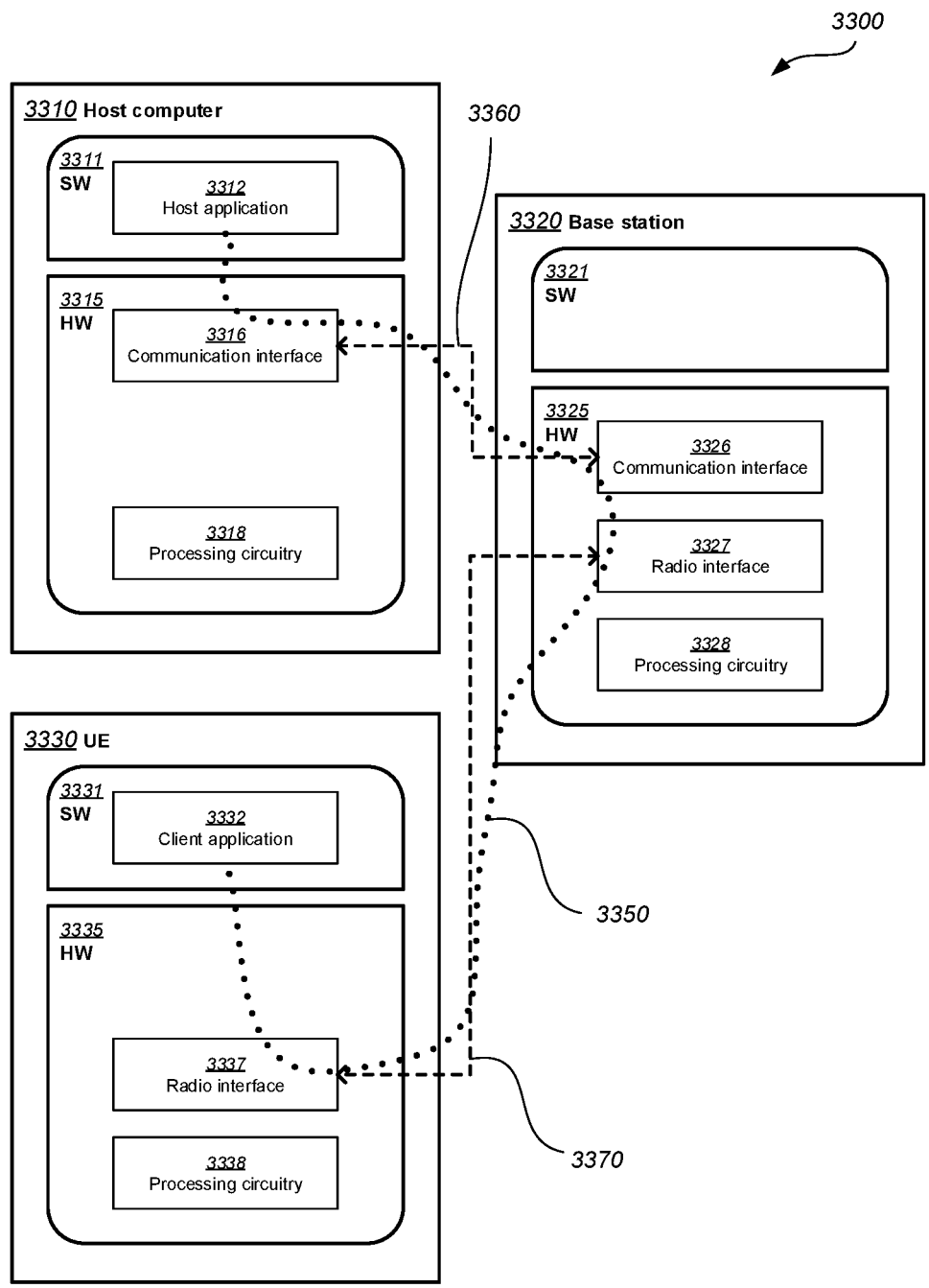
FIG. 16 is a diagram showing a host computer communicating via a base station with a user equipment in accordance with some embodiments.

It is noted that host computer 3310, base station 3320 and UE 3330 illustrated in FIG. 16 may be similar or identical to host computer 3230, one of base stations 3212*a*, 3212*b*, 3212*c* and one of UEs 3291, 3292 of FIG. 15, respectively. This is to say, the inner workings of these entities may be as shown in FIG. 16 and independently, the surrounding network topology may be that of FIG. 15.

In FIG. 16, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 17:
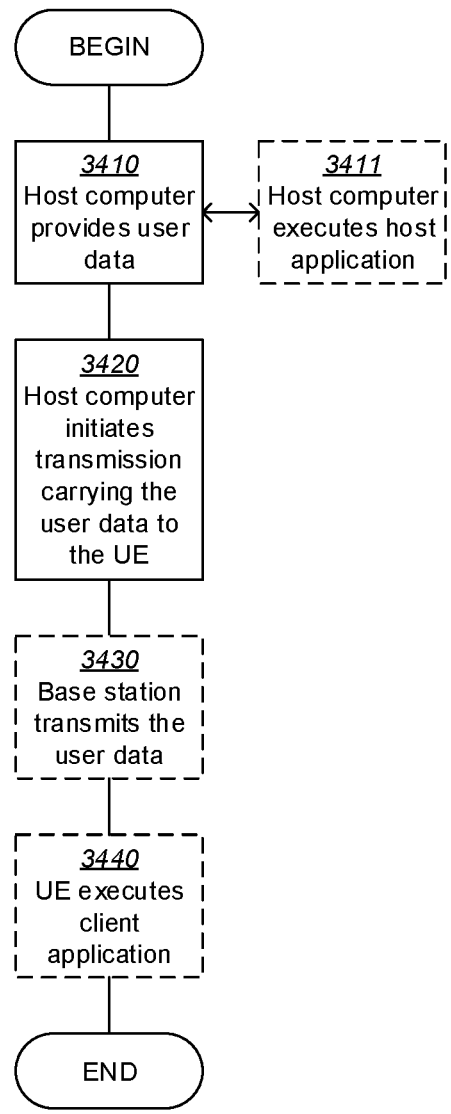
FIG. 17 is a flowchart illustrating a method implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 18:
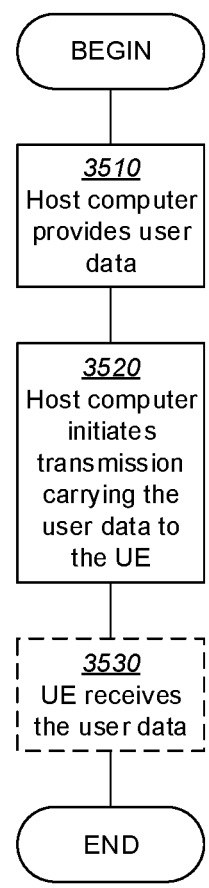
FIG. 18 is a flowchart illustrating a methods implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 15 and 15. For simplicity of the present disclosure, only drawing references to FIG. 18 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 19:
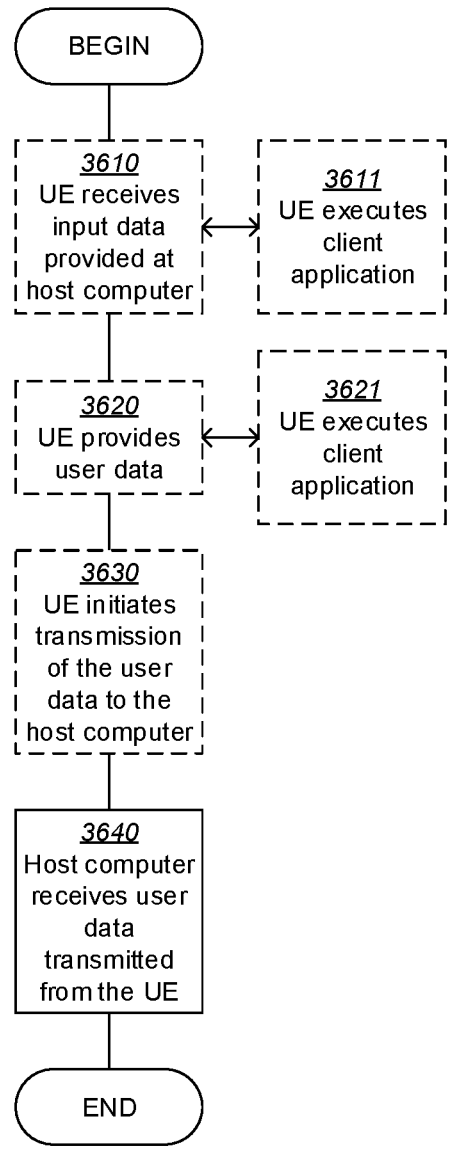
FIG. 19 is a flowchart illustrating a method implemented in a communication system in accordance with some embodiments.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 20:
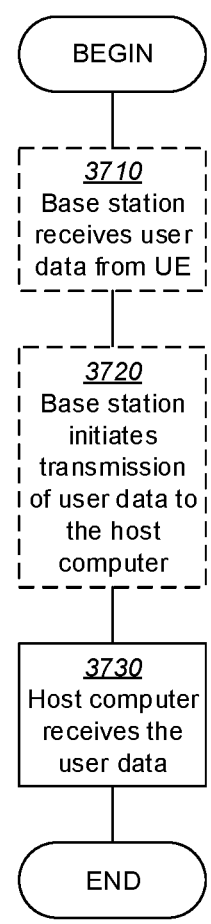
FIG. 20 is a flowchart illustrating a method implemented in a communication system in accordance with some embodiments.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a terminal device, comprising:
   receiving information of a physical uplink shared channel (PUSCH) resource allocation mode in a system information signaling from a network node, wherein the information of the PUSCH resource allocation mode includes an indicator of an allocation mode that indicates interlace, an indicator of at least one allocated interlace, and at least one scheduled physical resource block in the at least one allocated interlace; and
   transmitting a first message in a message A (msgA) in a two-step random access procedure, including a random access preamble and payload to the network node, wherein the payload is transmitted on a PUSCH resource based on the information of the PUSCH resource allocation mode.

2. The method according to claim 1, wherein the interlace comprises full interlace, partial interlace, or both full interlace and partial interlace.

3. The method according to claim 2, further comprising selecting the PUSCH resource allocation mode based on: a size of the payload, a downlink radio quality, channel occupancy, listen before talk (LBT) statistics, a terminal device's capability on whether the terminal device supports interlaced transmissions, a terminal device's power class, or any combination thereof.

4. The method according to claim 3, wherein selecting the PUSCH resource allocation mode further comprises:
   selecting the PUSCH resource allocation mode based on the size of the payload;
   selecting the PUSCH resource allocation mode based on the downlink radio quality;
   when the channel occupancy is lower than a first threshold, selecting the partial interlace or the full interlace, when the channel occupancy is not lower than the first threshold, selecting non-interlace;
   when LBT failures statistics is lower than a second threshold, selecting the partial interlace or the full interlace, when the LBT failures statistics is not lower than the second threshold, selecting non-interlace;
   when the terminal device's capability indicates that the terminal device supports full or partial interlaced transmissions, selecting the full interlace or the partial interlace, when the terminal device's capability indicates that the terminal device does not support full and partial interlaced transmissions, selecting non-interlace;
   when the terminal device's power class is lower than a third threshold, selecting the partial interlace or the full interlace, when the terminal device's power class is not lower than the third threshold, selecting non-interlace; or
   any combination thereof.

5. The method according to claim 2, wherein the full interlace spans a full frequency region of an interlace and the partial interlace spans a part of a frequency region of an interlace.

6. The method according to claim 1, wherein the PUSCH resource allocation mode is configured for the payload of the first message.

7. The method according to claim 1, wherein multiple physical resource blocks of an interlace are unequally or equally split between two or more partial interlaces.

8. The method according to claim 1, wherein for each random access channel occasion (RO) and associated one or more random access preambles, associated one or more PUSCH occasions are configured with one or more PUSCH resources.

9. The method according to claim 1, wherein a different PUSCH resource allocation mode is configured for each random access channel occasion (RO) and associated one or more random access preambles.

10. The method according to claim 1, wherein for each random access channel occasion (RO) and associated one or more random access preambles in a subband or channel, at least one associated PUSCH occasion is located in a different subband or channel.

11. The method according to claim 1, wherein the payload of the first message includes an identifier of the terminal device.

12. The method according to claim 1, wherein a mapping between random access channel preamble and associated PUSCH comprises one-to-one mapping, multiple-to-one mapping or one-to-multiple mapping.

13. The method according to claim 1, wherein a different PUSCH resource allocation mode is used for a retransmission of the payload of the first message.

14. The method according to claim 1, further comprising receiving a second message as a response to the first message from the network node.

15. The method according to claim 14, wherein the second message is a message B (msgB) in the two-step random access procedure.

16. A method at a network node, comprising:
  determining information of a physical uplink shared channel (PUSCH) resource allocation mode, wherein the information of the PUSCH resource allocation mode includes an indicator of an allocation mode that indicates interlace, an indicator of at least one allocated interlace, and at least one scheduled physical resource block in the at least one allocated interlace; and
  transmitting the information of the PUSCH resource allocation mode to a terminal device in a system information signaling for the terminal device, in order for the terminal device to transmit a first message in a message A (msgA) in a two-step random access procedure, including a random access preamble and payload to the network node, wherein the payload is transmitted on a PUSCH resource based on the information of the PUSCH resource allocation mode.

17. An apparatus at a terminal device, comprising:
  a processor; and
  a memory coupled to the processor, said memory containing instructions which, when executed by said processor, cause said apparatus to:
    receive information of a physical uplink shared channel (PUSCH) resource allocation mode in a system information signaling from a network node, wherein the information of the PUSCH resource allocation mode includes an indicator of an allocation mode that indicates interlace, an indicator of at least one allocated interlace, and at least one scheduled physical resource block in the at least one allocated interlace; and
    transmit a first message in a message A (msgA) in a two-step random access procedure, including a random access preamble and payload to the network node, wherein the payload is transmitted on a PUSCH resource based on the information of the PUSCH resource allocation mode.

* * * * *